United States Patent
Baek

(10) Patent No.: US 10,659,720 B2
(45) Date of Patent: May 19, 2020

(54) IMAGE SENSING SYSTEM THAT REDUCES POWER CONSUMPTION AND AREA AND OPERATING METHOD OF THE SAME

(71) Applicant: Samsung Electronics Co., Ltd., Suwon-si, Gyeonggi-do (KR)

(72) Inventor: Byung-Joon Baek, Incheon (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 16/047,326

(22) Filed: Jul. 27, 2018

(65) Prior Publication Data

US 2019/0182449 A1 Jun. 13, 2019

(30) Foreign Application Priority Data

Dec. 13, 2017 (KR) .................. 10-2017-0171456

(51) Int. Cl.
| | |
|---|---|
| *H04N 5/77* | (2006.01) |
| *H04N 5/378* | (2011.01) |
| *H04N 5/91* | (2006.01) |
| *H04N 5/345* | (2011.01) |
| *H04N 5/376* | (2011.01) |
| *H04N 9/804* | (2006.01) |
| *H04N 5/374* | (2011.01) |

(52) U.S. Cl.
CPC .......... *H04N 5/772* (2013.01); *H04N 5/3452* (2013.01); *H04N 5/378* (2013.01); *H04N 5/3742* (2013.01); *H04N 5/3765* (2013.01); *H04N 5/91* (2013.01); *H04N 9/8042* (2013.01)

(58) Field of Classification Search
CPC .......... H04N 5/772; H04N 5/378; H04N 5/91; H04N 5/3452; H04N 5/3765; H04N 5/3742; H04N 9/8042
See application file for complete search history.

(56) References Cited

U.S. PATENT DOCUMENTS

| | | |
|---|---|---|
| 8,301,816 B2 | 10/2012 | Fukuda |
| 8,946,610 B2 | 2/2015 | Iwabuchi et al. |
| 9,204,069 B2* | 12/2015 | Saito ............... H04N 5/363 |
| 9,231,011 B2 | 1/2016 | Solhusvik et al. |

(Continued)

FOREIGN PATENT DOCUMENTS

JP 2010171487 A 8/2010

OTHER PUBLICATIONS

Haruta et al. "A 1/2.3inch 20Mpixel 3-Layer Stacked CMOS Image Sensor with DRAM" ISSCC 2017, Session 4, Imagers, 4.6, 2017 IEEE International Solid-State Circuits Conference, p. 76-78.

*Primary Examiner* — Luong T Nguyen
(74) *Attorney, Agent, or Firm* — Myers Bigel, P.A.

(57) ABSTRACT

An image sensing system includes a pixel array, an analog-to-digital converter circuit, and a memory. The pixel array includes a first pixel, a second pixel, and a third pixel interposed between the first pixel and the second pixel. During a first sensing time, the analog-to-digital converter circuit converts a first image signal received from the first pixel to first image data and converts a second image signal received from the second pixel to second image data. During a second sensing time, the analog-to-digital converter circuit converts a third image signal received from the third pixel to third image data. The first image data and the second image data are written in the memory during a first write time, and the third image data are written in the memory during a second write time.

18 Claims, 14 Drawing Sheets

(56) References Cited

U.S. PATENT DOCUMENTS

| | | | |
|---|---|---|---|
| 9,609,213 B2* | 3/2017 | Wakabayashi | H04N 5/378 |
| 2005/0237408 A1* | 10/2005 | Muramatsu | H04N 3/15 |
| | | | 348/308 |
| 2012/0307120 A1* | 12/2012 | Ito | H04N 5/341 |
| | | | 348/302 |
| 2013/0128086 A1* | 5/2013 | Juen | H01L 27/14636 |
| | | | 348/302 |
| 2014/0252632 A1 | 9/2014 | Barth et al. | |
| 2015/0146062 A1 | 5/2015 | Tanaka | |
| 2015/0189214 A1 | 7/2015 | Kurose | |
| 2015/0215561 A1* | 7/2015 | Maehashi | H04N 5/3745 |
| | | | 348/273 |
| 2015/0288916 A1 | 10/2015 | Yokoi | |
| 2016/0373629 A1 | 12/2016 | Jung et al. | |
| 2017/0092680 A1 | 3/2017 | Kwon | |

* cited by examiner

IMAGE SENSING SYSTEM THAT REDUCES POWER CONSUMPTION AND AREA AND OPERATING METHOD OF THE SAME

CROSS-REFERENCE TO RELATED APPLICATION

This U.S. non-provisional patent application claims priority under 35 U.S.C. § 119 to Korean Patent Application No. 10-2017-0171456 filed on Dec. 13, 2017, in the Korean Intellectual Property Office, the disclosures of which incorporated herein in its entirety by reference.

BACKGROUND

Embodiments of the inventive concept disclosed herein relate to image processing, and more particularly, relate to an image sensing system and an operating method thereof.

Various electronic devices such as a smartphone, a personal computer (PC), or a digital camcorder are equipped with an image sensor for obtaining and processing images. The image sensor may include a charge coupled device (CCD) or a CMOS image sensor (CIS). The image sensor includes a plurality of pixels. The pixels are arranged in the form of an array. The pixels output analog signals based on light incident thereon. The analog signals output from the image sensor pixels are converted into digital signals, and the digital signals are stored as image data after being digitized.

An image sensing system includes the image sensor. The image sensing system further includes a memory for storing an image obtained from the image sensor and an image signal processor for processing the image. The image signal processor may perform various functions such as image compression, object recognition, and/or measurement of brightness of an image.

There is increased demand for miniaturization, integration, and portability of electronic devices. For this reason, there is a need to decrease the area of the image sensing system included in the electronic device and to reduce power consumption for the purpose of securing the portability. To this end, there is a need to optimize a signal transfer between the image sensor, the memory, and the image signal processor included in the image sensing system.

SUMMARY

Embodiments of the inventive concept provide an image sensing system that reduces power consumption and the area thereof and an operating method thereof.

According to some embodiments, an image sensing system includes a pixel array, an analog-to-digital converter circuit, a memory, and a data buffer. The pixel array includes a first pixel, a second pixel, and a third pixel interposed between the first pixel and the second pixel. The first pixel outputs a first image signal, and the second pixel output a second image signal. The third pixel outputs a third image signal after the first and second image signals are output.

During a first sensing time, the analog-to-digital converter circuit converts the first image signal received from the first pixel to first image data and converts the second image signal received from the second pixel to second image data. During a second sensing time, the analog-to-digital converter circuit converts the third image signal received from the third pixel to third image data.

The data buffer transfers the third image data to the memory after transferring the first and second image data to the memory in a write operation. The first and second image data are written in the memory during a first write operation, and the third image data are written in the memory during a second write time. In a readout operation, the data buffer may output the second image data after outputting the first image data and may output the third image data after outputting the second image data.

According to some embodiments, a method of operating an image sensing system includes generating an image signal corresponding to one frame at a pixel array including first to fourth line pixel arrays arranged in a column direction, converting an image signal generated from first pixels of the first line pixel array to first image data and converting an image signal generated from third pixels of the third line pixel array to third image data, converting an image signal generated from second pixels of the second line pixel array to second image data and converting an image signal generated from fourth pixels of the fourth line pixel array to fourth image data, writing the first image data in a first bank and writing the third image data in a second bank, and writing the second image data in the first bank and writing the fourth image data in the second bank.

BRIEF DESCRIPTION OF THE FIGURES

The above and other objects and features of the inventive concept will become apparent by describing in detail example embodiments thereof with reference to the accompanying drawings.

DETAILED DESCRIPTION

It is noted that aspects of the inventive concept described with respect to one embodiment, may be incorporated in a different embodiment although not specifically described relative thereto. That is, all embodiments and/or features of any embodiment can be combined in any way and/or combination. These and other objects and/or aspects of the present inventive concept are explained in detail in the specification set forth below.

Embodiments of the inventive concept will be described clearly and in detail with reference to accompanying drawings to such an extent that an ordinary one in the art implements embodiments of the invention.

An image sensing system may use a column shared readout which produces image data that is output to be different from an arrangement order of pixels that make up the image. Varying the arrangement order of pixels may result in inefficient signal transfer of image data within the image sensing system, such as transfer of image data between the image sensor and memory or other components of the image sensing system. Inefficient signal transfer due to sub-optimal arrangement order of pixels may cause an increase in the area of the image sensing system in a semiconductor device and/or substrates, resulting in increased power consumption and/or device complexity. Some embodiments of the present inventive concepts arise from the recognition for a need to decrease the area of the image sensing system by improving and/or optimizing signal transfer between various components of the image sensing system such as between the image sensor, the memory, control circuits, data buffers, and/or analog-to-digital converters, etc.

Figure 1:
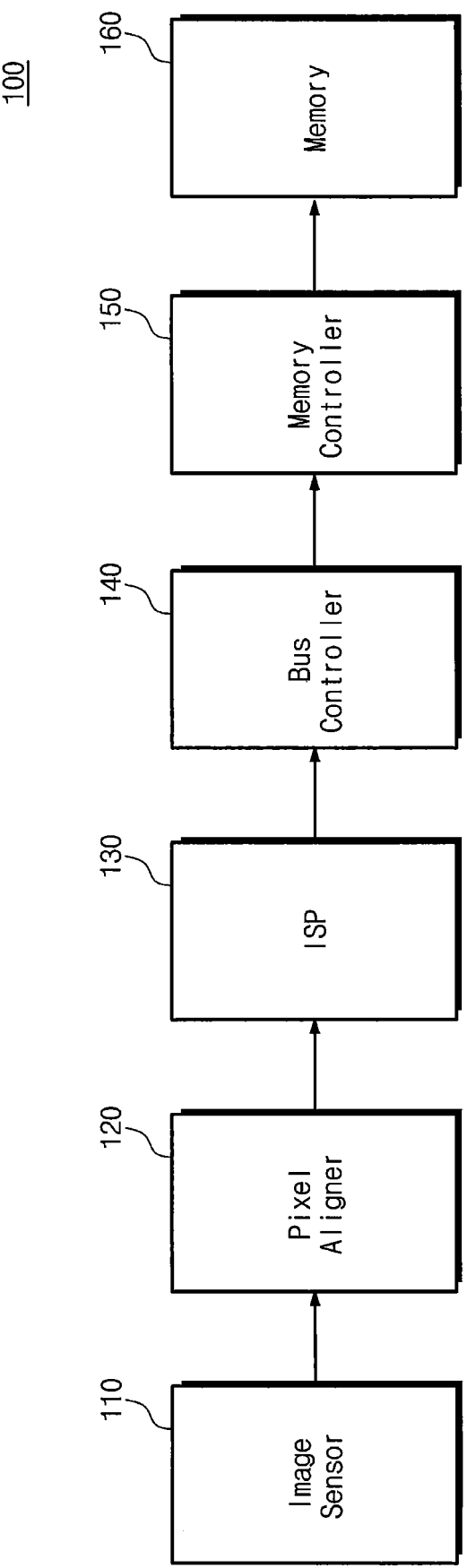
FIG. 1 is a block diagram of an image sensing system according to example embodiments of the present inventive concept.

FIG. 1 is an example block diagram of an image sensing system. Referring to FIG. 1, an image sensing system 100 includes an image sensor 110, a pixel aligner 120, an image signal processor (ISP) 130, a bus controller 140, a memory controller 150, and a memory 160. The image sensing system 100 may be configured to obtain an image of the outside and to process and store the obtained image.

The image sensor 110 senses external light. The external light may be light that is emitted from one or more light sources and is then reflected by a subject. The image sensor 110 converts the sensed light to an image signal that may be an electrical signal. To this end, the image sensor 110 may include a pixel array that includes a plurality of pixels. The image sensor 110 may convert the image signal, which may be an analog signal, to image data that may be a digital signal. The image sensor 110 may output the image data corresponding to a plurality of frames as time passes. The image data may be a stream of data corresponding to the plurality of image frames.

The pixel aligner 120 may align a plurality of image data based on the arrangement of the plurality of pixels included in the image sensor 110. The image data may be based on image signals that the plurality of pixels generate. The plurality of image data may be output to be different from the arrangement order of the plurality of pixels. In other words, the ordering of the image data may be different from the pixel order. The pixel aligner 120 may align the plurality of image data so as to correspond to the arrangement order of the plurality of pixels. For example, the pixel aligner 120 may align the image data in the raster scan order corresponding to the order of pixels arranged in a row direction. In a raster scan, an image may be subdivided into a sequence of strips, such as horizontal strips known as "scan lines". Each scan line may be divided into discrete pixels for processing. This ordering of pixels by rows may be referred to as raster order, or raster scan order. A line buffer (not illustrated) may be interposed between the image sensor 110 and the pixel aligner 120 for the purpose of aligning the image data.

The image signal processor 130 receives the aligned image data from the pixel aligner 120. The image signal processor 130 may perform various image processing operations based on the aligned image data. To perform the image processing operations, the image signal processor 130 may include one or more function blocks (or intellectual property blocks). The image signal processor 130 may perform various arithmetic operations for image processing. For example, the image signal processor 130 may perform an operation of compressing image data and/or recognizing an object from the image data. The arithmetic operation may be performed by using image data corresponding to a particular pixel and image data corresponding to a pixel adjacent to the particular pixel.

In the case where image data of a pixel adjacent to a reference pixel are used, the alignment of the image data may be required. For example, in the case where the image signal processor 130 compresses image data, the degree of compression of image data may be determined based on a result of comparing image data of the reference pixel and image data of a pixel adjacent to the reference pixel. Accordingly, in the case where the image signal processor 130 receives image data not aligned, image data of pixels spaced apart from each other may be compared, thereby causing a decrease in a compression ratio, reducing the efficiency of the compression. Since adjacent pixels cannot be referenced, a compression manner may be restricted, thereby causing a decrease in the quality of images. An operation for detecting image data of an adjacent pixel may be performed. Accordingly, the pixel aligner 120 may be disposed between the image sensor 110 and the image signal processor 130.

The bus controller 140 controls a data transfer to a bus that is a communication path between the image signal processor 130 and the memory controller 150. In the case where a bus is used as an interface between the image signal processor 130 and the memory controller 150, the bus controller 140 may be provided. The bus controller 140 may receive the aligned image data from the image signal processor 130. The bus controller 140 may output image data to be suitable for the bus standard of the bus. The bus controller 140 may control a transfer of image data instead of or in addition to a central processing unit (CPU) (not illustrated) connected to the bus, thereby alleviating the information processing load of the CPU. The CPU may directly control the transfer of the image data. In this case, the CPU may perform a function of the bus controller 140, and a separate bus controller may not be provided in the image sensing system 100.

The memory controller 150 controls an operation of the memory 160. The memory controller 150 writes image data provided from the bus controller 140 in the memory 160. The memory controller 150 reads image data stored in the memory 160 and provides the read data to the image signal processor 130 through the bus controller 140. The memory controller 150 may receive the aligned image data from the image signal processor 130. After storing the aligned image data in the memory 160, the memory controller 150 may read image data from the memory 160 and may transfer the read image data to the image signal processor 130. A physical layer (not illustrated) may be interposed between the memory controller 150 and the memory 160 for a data transfer between the memory controller 150 and the memory 160. The physical layer may include wires, vias, and/or other conductive elements used for signal transfer.

The memory 160 may be configured to store image data. The memory 160 may be, but is not limited to, a DRAM that stores image data in the form of charges charged in a cell capacitor. In a write operation, the aligned image data may be stored in the memory 160 under control of the memory controller 150. In a readout operation, image data stored in the memory 160 may be read in an aligned order under control of the memory controller 150.

When image data are input to and/or output from the memory 160, an internal clock speed of the memory 160 may be different from an external clock speed of the memory 160. For example, a clock speed on a path through which image data are transferred from the memory controller 150 to the memory 160 may be higher than a clock speed on a path through which image data are transferred within the memory 160. In this case, the amount of data input to and/or output from the memory 160 during an external clock period may be smaller than the amount of data transferred within the memory 160 during an internal clock period. Image data may be aligned to correspond to the amount of data transferred much more during one clock period within the memory 160. That is, the alignment process may be performed two times, that is, 1) alignment of image data output from the image sensor 110 and 2) alignment of image data provided to the memory 160. In this case, power consumption of the image sensing system 100 may increase, and/or the area of the image sensing system 100 may increase.

Figure 2:
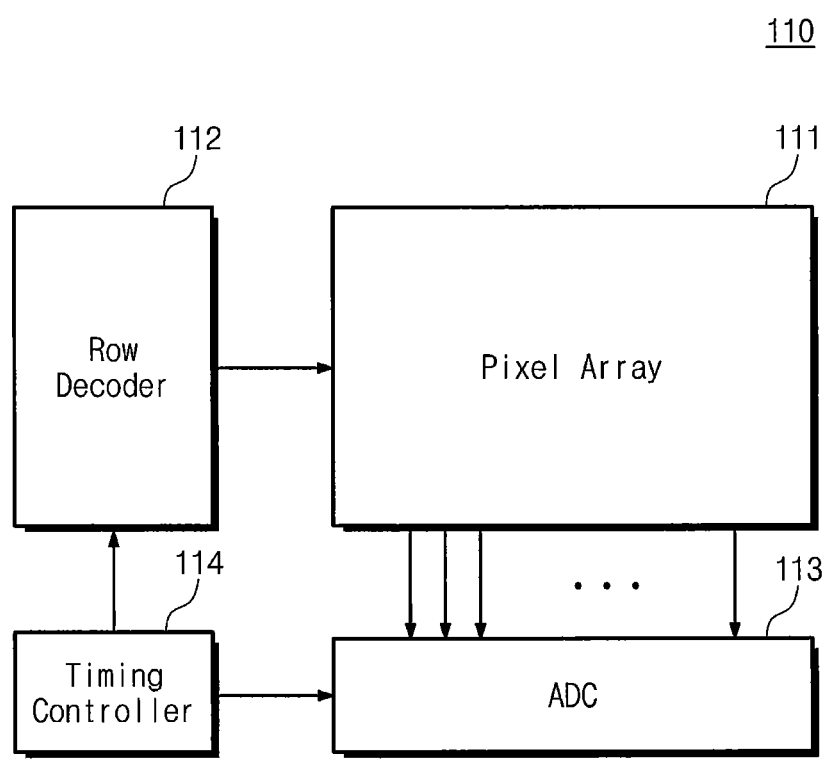
FIG. 2 is a block diagram of an image sensor of FIG. 1 according to example embodiments of the present inventive concept.

FIG. 2 is a block diagram of an image sensor of FIG. 1. Referring to FIG. 2, the image sensor 110 may include a pixel array 111, a row decoder 112, an analog-to-digital converter (ADC) circuit 113, and a timing controller 114. The image sensor 110 of FIG. 2 may be understood as one example embodiment, and the image sensor 110 of FIG. 1 is not limited thereto.

The pixel array 111 includes a plurality of pixels arranged two-dimensionally. Each of the plurality of pixels converts a light signal sensed from the outside to an image signal represented by an electrical signal. The pixel array 111 outputs the sensed image signal in response to driving signals. The pixel array 111 may provide the image signal sensed by each of the plurality of pixels to the analog-to-digital converter circuit 113 through a plurality of column lines.

The row decoder 112 may select pixels, which belong to one or more rows, from among the pixels included in the pixel array 111. At least a part of pixels included in the selected row may provide the sensed electrical signal to the analog-to-digital converter circuit 113. To this end, the row decoder 112 may generate a row select signal and may provide the row select signal to the pixel array 111. The row decoder 112 may generate the row select signal under control of the timing controller 114.

The analog-to-digital converter circuit 113 converts the analog signal output from the pixel array 111 to image data that may be a digital signal. The analog-to-digital converter circuit 113 may convert an image signal to image data by sampling the image signal in a digital manner in units of columns under control of the timing controller 114. The analog-to-digital converter circuit 113 may include a correlated double sampler for digital sampling and for removing a fixed pattern noise (FPN). The analog-to-digital converter circuit 113 may output image data to the pixel aligner 120 of FIG. 1.

The timing controller 114 may control overall operations of the image sensor 110. The timing controller 114 may provide a control signal to the row decoder 112 and the analog-to-digital converter circuit 113 to drive the image sensor 110. Under control of the timing controller 114, the image sensor 110 may output image data to the pixel aligner 120 of FIG. 1.

Figure 3:
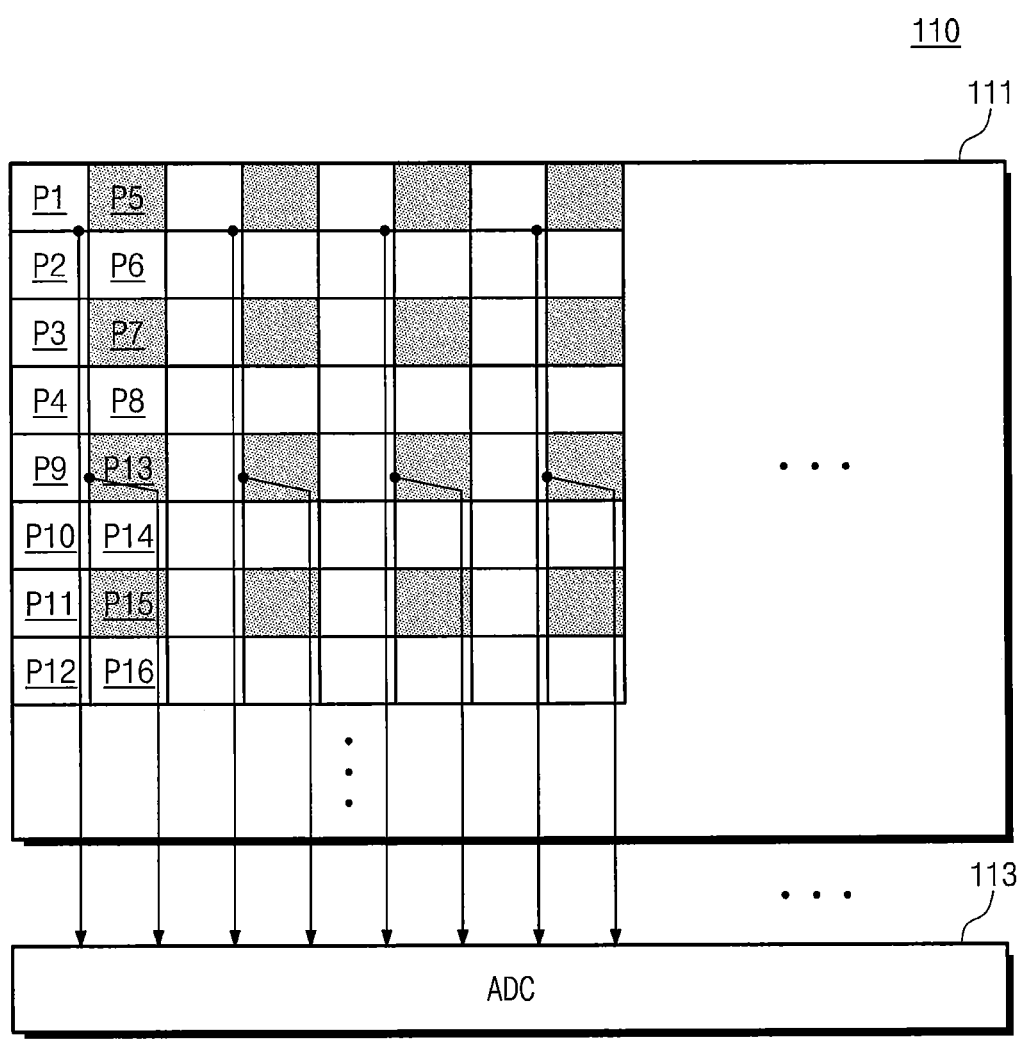
FIG. 3 is a view for describing a process in which an image sensor of FIG. 1 outputs image signals according to example embodiments of the present inventive concept.

FIG. 3 is a view for describing an example process in which an image sensor of FIG. 1 outputs image signals. Referring to FIG. 3, the image sensor 110 may include the pixel array 111 and the analog-to-digital converter circuit 113. For convenience of description, a row decoder and a timing controller are omitted. The output order of image signals to be described with reference to FIG. 3 is an example, and the output order of image signals of the image sensor 110 of FIG. 1 is not limited thereto. For convenience of description, FIG. 3 will be described with reference to reference marks of FIG. 1.

The pixel array 111 includes first to sixteenth pixels P1 to P16. The pixel array 111 may be implemented in such a way that a structure of the first to sixteenth pixels P1 to P16 is repeated in a row direction or a column direction. The first pixel P1, the second pixel P2, the fifth pixel P5, and the sixth pixel P6 may constitute a Bayer pattern. A Bayer pattern may use twice as many green elements as blue and red elements combined, in order to mimic the physiology of the human eye. For example, the first pixel P1 may be a first green pixel, the second pixel P2 may be a blue pixel, the fifth pixel P5 may be a red pixel, and the sixth pixel P6 may be a second green pixel. The first pixel P1, the third pixel P3, the ninth pixel P9, and the eleventh pixel P11 may be the same color pixel. The second pixel P2, the fourth pixel P4, the tenth pixel P10, and the twelfth pixel P12 may be the same color pixel. The fifth pixel P5, the seventh pixel P7, the thirteenth pixel P13, and the fifteenth pixel P15 may be the same color pixel. The sixth pixel P6, the eighth pixel P8, the fourteenth pixel P14, and the sixteenth pixel P16 may be the same color pixel.

The first to sixteenth pixels P1 to P16 output first to sixteenth image signals, respectively. During a first sensing time, the first pixel P1 may output the first image signal, and the ninth pixel P9 may output the ninth image signal. The first pixel P1 and the ninth pixel P9 may output image signals at the same time or overlapping in time. During the first sensing time, the first and ninth image signals may be converted to digital signals by the analog-to-digital converter circuit 113. In the case where image data of pixels having the same color are transferred in parallel to the memory 160 through the analog-to-digital converter circuit 113, interference such as crosstalk between image data may decrease. It will be understood that, although the terms first, second, third, etc. may be used herein to describe various elements, elements should not be limited by these terms. Rather, these terms are only used to distinguish one element from another element. Thus, a first element discussed below could be termed a second element without departing from the scope of the present inventive concepts.

During a second sensing time following the first sensing time, the second pixel P2 may output the second image signal, and the tenth pixel P10 may output the tenth image signal. Afterwards, during a third sensing time the third and eleventh pixels P3 and P11 may output the third and eleventh image signals, and, during a fourth sensing time the fourth and twelfth pixels P4 and P12 may output the fourth and twelfth image signals. Afterwards, during a fifth sensing time, the fifth and thirteenth pixels P5 and P13 may output the fifth and thirteenth image signals, the sixth and fourteenth pixels P6 and P14 may output the sixth and fourteenth image signals during a sixth sensing time, the seventh and fifteenth pixels P7 and P15 may output the seventh and fifteenth image signals during a seventh sensing time, and the eighth and sixteenth pixels P8 and P16 may output the eighth and sixteenth image signals during an eighth sensing time.

The analog-to-digital converter circuit 113 may receive data of a mixed order, not a raster scan order arranged in the row direction. That is, the analog-to-digital converter circuit 113 receives the first pixel image signal and the ninth pixel image signal in parallel during the first sensing time and receives the second pixel image signal and the tenth pixel image signal in parallel during the second sensing time. The analog-to-digital converter circuit 113 may convert image signals to image data in an input order and may output the image data to the pixel aligner 120 of FIG. 1. As a result, the analog-to-digital converter circuit 113 converts the first to sixteenth image signals to first to sixteenth image data, respectively.

The pixel aligner 120 aligns the first to sixteenth image data. For example, the pixel aligner 120 may receive the first to eighth image data in regular sequence. When the pixel aligner 120 receives the fifth image data after receiving the first to fourth image data, the pixel aligner 120 may output the first image data and the fifth image data corresponding to a first row. When the pixel aligner 120 receives the sixth image data, the pixel aligner 120 may output the second image data and the sixth image data corresponding to a second row. As such, the pixel aligner 120 may align image data in units of rows.

Figure 4:
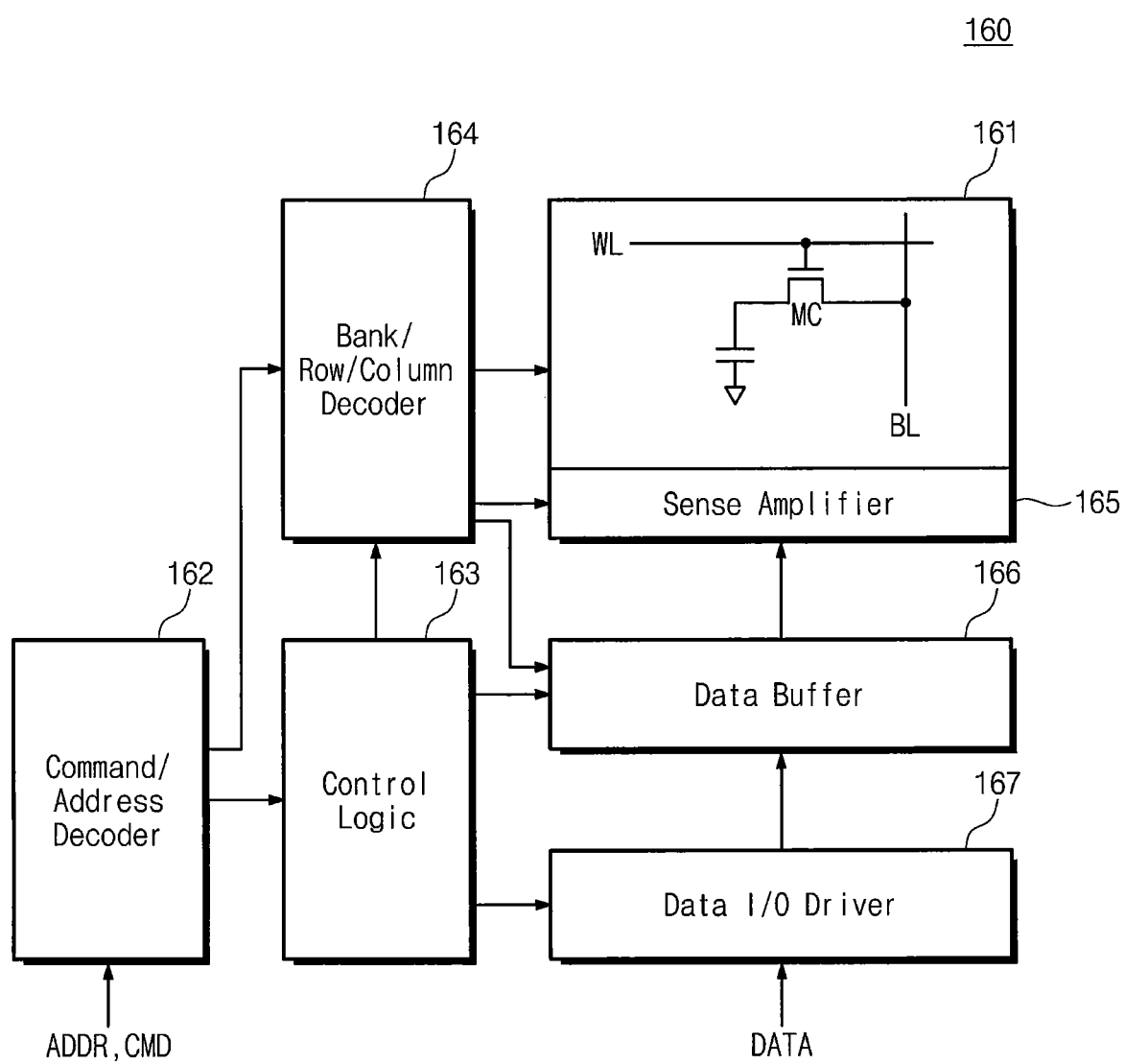
FIG. 4 is a block diagram of a memory of FIG. 1 according to example embodiments of the present inventive concept.

FIG. 4 is a block diagram of a memory of FIG. 1. Referring to FIG. 4, the memory 160 may include a memory cell array 161, a command/address decoder 162, control logic 163, a bank/row/column decoder 164, a sense amplifier 165, a data buffer 166, and a data input/output driver 167. The memory 160 of FIG. 4 may be understood as one embodiment, and the memory 160 of FIG. 1 is not limited thereto. For convenience of description, FIG. 4 will be described with reference to reference marks of FIG. 1.

The memory cell array 161 includes a plurality of memory cells MC that are connected to word lines WL and bit lines BL which may be arranged two-dimensionally. Each of the memory cells MC may include a cell capacitor and/or an access transistor. In each memory cell MC, a gate of the access transistor may be connected to the word line WL arranged in the row direction. In each memory cell MC, a first end of the access transistor may be connected to the bit line BL arranged in the column direction. A second end of the access transistor may be connected to the cell capacitor. The memory cell array 161 may be divided into a plurality of banks and may be accessed in units of banks.

The command/address decoder 162 may receive and decode a command CMD and an address ADDR provided from the memory controller 150 of FIG. 1. The command/address decoder 162 may provide the decoded command CMD or a variant thereof to the control logic 163 and may provide the decoded address ADDR or a variant thereof to the bank/row/column decoder 164. The command/address decoder 162 may provide the control logic 163 with a control signal for controlling an operation of the control logic 163 based on the command CMD and/or the address ADDR. The command/address decoder 162 may include a command/address buffer for temporarily storing the command CMD and the address ADDR for processing.

The control logic 163 may control overall operations of the memory 160, such as an operating order control or a state control, based on the decoded command or the control signal from the command/address decoder 162. The control logic 163 may provide the control signal to the bank/row/column decoder 164, the data buffer 166, and the data input/output driver 167 to drive the bank/row/column decoder 164, the data buffer 166, and the data input/output driver 167.

The bank/row/column decoder 164 may select a bank to be accessed among the plurality of banks included in the memory cell array 161 based on the address ADDR. For example, the bank/row/column decoder 164 may provide the bank select signal to the data buffer 166 to allow the data buffer 166 to transfer data to a bank to be accessed. The bank/row/column decoder 164 may select a memory cell in a bank to be accessed.

In response to the address ADDR, the bank/row/column decoder 164 selects a word line of a memory cell to be accessed in the selected bank and selects a bit line of a memory cell which data are input to and/or output from. To this end, the bank/row/column decoder 164 may include a bank decoder selecting a bank, a row decoder selecting a word line, and a column decoder selecting a bit line. The bank/row/column decoder 164 may enable the selected word line based on the address ADDR. The bank/row/column decoder 164 may provide a row select signal for selecting a word line to the memory cell array 161 and may provide a column select signal for selecting a bit line to the sense amplifier 165. Sense amplifier 165 may be part of the read circuitry that is used when data is read from the memory. The role of the sense amplifier 165 may be to sense low power signals from a bit line that represents a data bit (i.e. 1 or 0) stored in a memory cell of memory cell array 161, and amplify the small voltage swing to recognizable logic levels so the data may be interpreted properly.

The sense amplifier 165 may write data in a memory cell connected with a selected bit line or may sense previously written data through the selected bit line. The sense amplifier 165 may write or sense data through a bit line selected based on the column select signal provided from the bank/row/column decoder 164. The data may be image data. The sense amplifier 165 may write data in a memory cell through a bit line in a write operation and may sense and output data stored in a memory cell through a bit line in a readout operation. The sense amplifier 165 may rewrite data stored in a memory cell in a refresh operation.

The data buffer 166 may output data input from the data input/output driver 167 to the sense amplifier 165 after temporarily storing the input data. The data buffer 166 may output data to the sense amplifier 165 under control of the control logic 163. The data buffer 166 may provide data to the sense amplifier 165 such that the data are written in a selected bank based on the bank select signal provided from the bank/row/column decoder 164. For example, the data buffer 166 may output data to a partial area of the sense amplifier 165 writing data in the selected bank.

The data input/output driver 167 may convert data "DATA" provided from the memory controller 150 so as to correspond to an internal clock speed of the memory 160 and the amount of data transferred during a clock period and may output the converted data to the data buffer 166. As described above, an internal clock speed and/or an external clock speed of the memory 160 may be different, and the amount of data "DATA" provided to the data input/output driver 167 per clock period and/or the amount of data "DATA" transferred within the memory 160 may be different. The data input/output driver 167 may align data "DATA" so as to correspond to the amount of data "DATA" to be transferred per clock period, which may be required within the memory 160. To this end, the data input/output driver 167 may include a data aligner.

Figure 5:
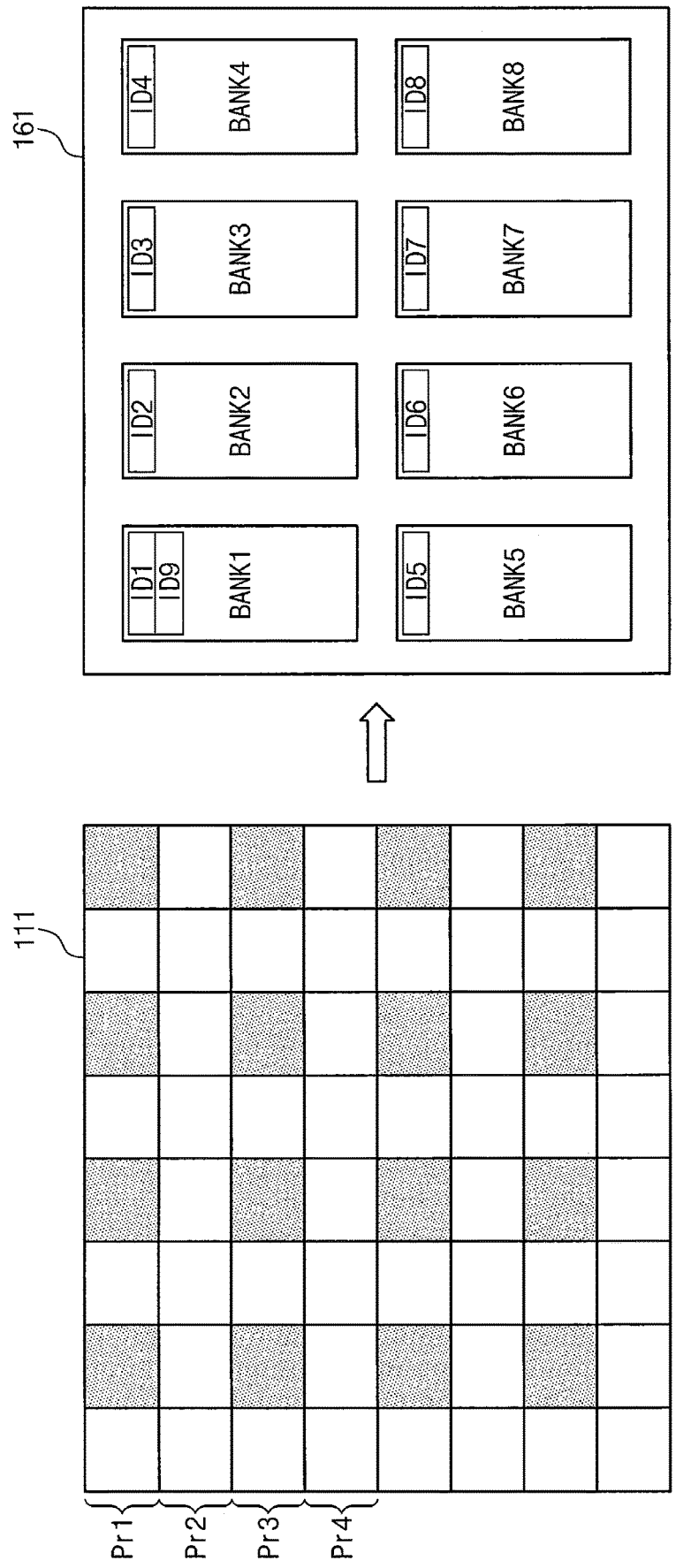
FIG. 5 is a view for describing an image data writing process of the image sensing system of FIG. 1 according to example embodiments of the present inventive concept.

FIG. 5 is a view for describing an image data writing process of an image sensing system of FIG. 1. For convenience of description, FIG. 5 will be described with reference to reference marks of FIG. 1. Referring to FIG. 5, the pixel array 111 includes a first line pixel array Pr1 corresponding to a first row, a second line pixel array Pr2 corresponding to a second row, a third line pixel array Pr3 corresponding to a third row, and a fourth line pixel array Pr4 corresponding to a fourth row. Pixels included in each of the first to fourth line pixel arrays Pr1 to Pr4 may be arranged in the row direction.

First to fourth line image data may be generated based on electrical signals that the first to fourth line pixel arrays Pr1 to Pr4 generate, respectively. Referring to an image data generating process of FIG. 3, the image sensor 110 outputs image data corresponding to pixels disposed at odd-numbered columns of the first line pixel array Pr1 and then outputs image data corresponding to pixels disposed at odd-numbered columns of the second line pixel array Pr2. Image data corresponding to pixels disposed at even-numbered columns of the first line pixel array Pr1 are output after image data corresponding to pixels disposed at odd-numbered columns of each of the first to fourth line pixel arrays Pr1 to Pr4 are output.

The pixel aligner 120 may align image data that are mixed, i.e. not arranged in a row direction order. When image data corresponding to pixels disposed at even-numbered columns of the first line pixel array Pr1 are output, the pixel aligner 120 may combine image data corresponding to pixels disposed at odd-numbered columns of the first line pixel array Pr1 and the image data corresponding to the pixels disposed at the even-numbered columns of the first line pixel array Pr1. The pixel aligner 120 outputs image data based on the first line pixel array Pr1 and then outputs image data based on the second line pixel array Pr2. The image data are transferred to the memory cell array 161 of the memory 160 through the image signal processor 130, the bus controller 140, and the memory controller 150.

The memory cell array 161 may include first to eighth banks BANK1 to BANK8. The image data may be sequentially written in the first to eighth banks BANK1 to BANK8. The image data based on the first line pixel array Pr1 may include first to third data ID1 to ID3. The image data based on the second line pixel array Pr2 may include fourth to sixth data ID4 to ID6. The image data based on the third line pixel array Pr3 may include seventh to ninth data ID7 to ID9. It is assumed that the size of each of the first to ninth image data ID1 to ID9 is similar to the size of data stored in one row of each of the first to eighth banks BANK1 to BANK8.

Since image data are written in an aligned order, that is, in a raster scan order, a write operation may be performed in the order of the first to ninth image data ID1 to ID9 for the first time. The order may be determined based on the arrangement of the image data based on the first to third line pixel arrays Pr1 to Pr3 and the data arrangement in the memory 160. The first to eighth image data ID1 to ID8 are respectively written at the first rows of the first to eighth banks BANK1 to BANK8. The ninth image data ID9 are written at a second row of the first bank BANK1. The write operation may need arrangement on both sides of the image sensor 110 and the memory 160, i.e. before and/or after each of the image sensor 110 and the memory 160, thereby causing an increase in power consumption. Also, since image data are stored in the memory 160 over various components and buses, a transfer path of image data may be complicated. Below, an image sensing system for reducing power consumption will be described.

Figure 6:
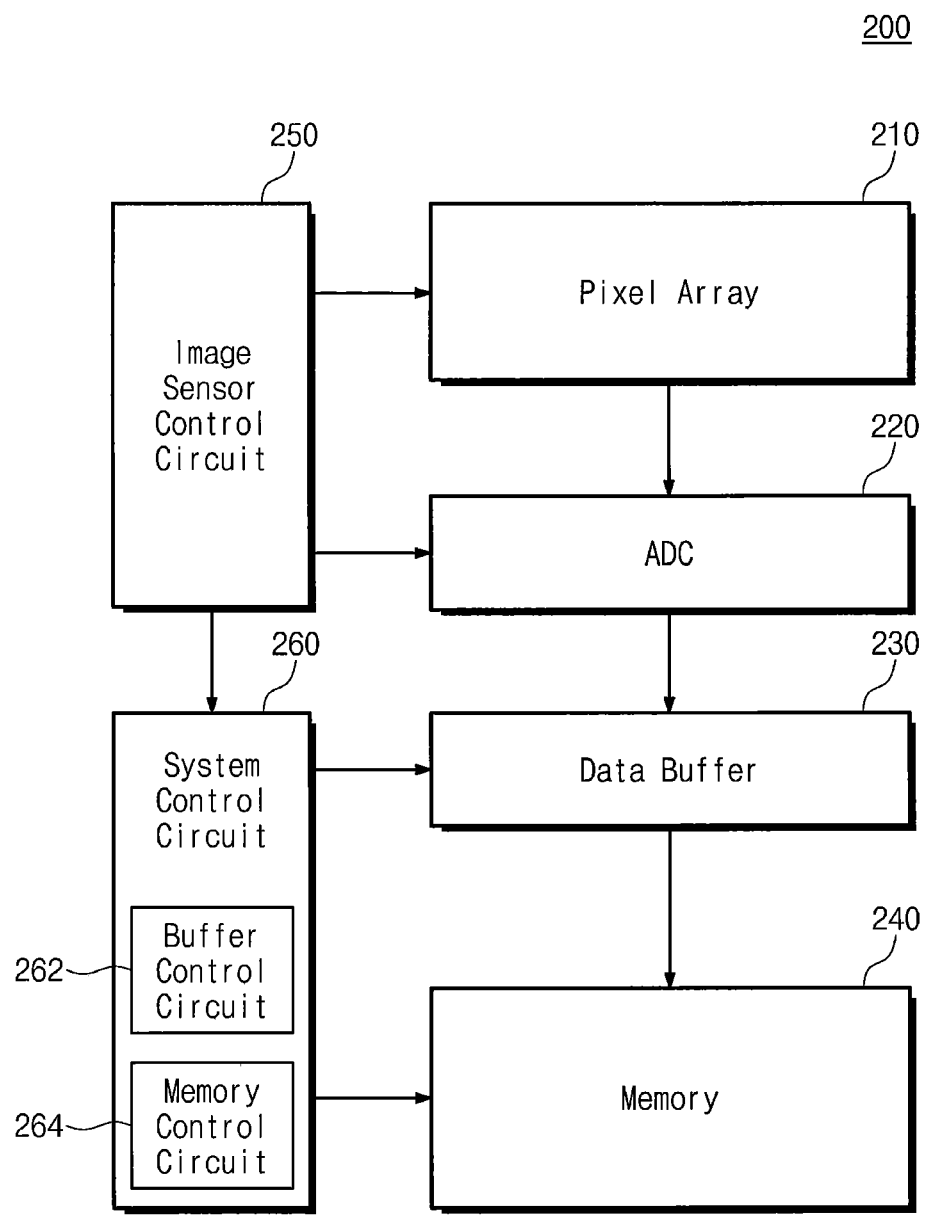
FIG. 6 is a block diagram of an image sensing system according to example embodiments of the present inventive concept.

FIG. 6 is a block diagram of an image sensing system according to some embodiments of the inventive concept. Referring to FIG. 6, an image sensing system 200 includes a pixel array 210, an analog-to-digital converter circuit 220, a data buffer 230, a memory 240, an image sensor control circuit 250, and a system control circuit 260. The pixel array 210 and the analog-to-digital converter circuit 220 may have substantially the same configurations as the pixel array 111 and the analog-to-digital converter circuit 113 of FIG. 2, and may output and convert image signals in a similar manner as described with reference to FIG. 3.

The data buffer 230 transfers image data received from the analog-to-digital converter circuit 220 to the memory 240 in a write operation. The write operation may include an operation of recording or storing image data in the memory 240. Compared with FIG. 1, the image sensing system 200 may not transfer image data to the memory 240 through the pixel aligner 120, the image signal processor 130, the bus controller 140, and the memory controller 150.

Since image data does not pass through the image signal processor 130 of FIG. 1, the alignment of image data through the pixel aligner 120 is not required. However, for the image signal processor 130 to perform a function in which alignment of image data is not required, the image signal processor 130 may be connected between the analog-to-digital converter circuit 220 and the data buffer 230 with some pins. The image sensing system 200 may not need a separate configuration for aligning image data. In other words, a data transfer path may be optimized as described herein, thereby reducing power consumption and decreasing the area for implementing a system.

Also, the image sensing system 200 may not transfer image data by using an interface such as a bus. That is, since an image sensor and a memory are merged into an integrated functionality, data serializing and deserializing for using an interface between the pixel array 210 and the memory 240 may not be needed. As such, a configuration controlling an interface such as a bus controller for transferring image data and a configuration such as a physical layer or the like may not be necessary. Accordingly, a data transfer path may be optimized or reduced such that power consumption is reduced and the area for system implementation decreases.

The data buffer 230 may provide a transfer path of image data to a storage area of the memory 240, at which the image data will be stored, under control of the system control circuit 260. For example, the memory 240 may be divided into a plurality of banks, and the data buffer 230 may provide a transfer path that allows image data to be transferred to a bank, at which the image data will be stored, from among the plurality of banks. Also, the data buffer 230 may provide a transfer path that allows image data to be transferred to a bit line, through which the image data will be written, of the selected bank. To this end, the data buffer 230 may include a plurality of buffers, and the plurality of buffers may be implemented in the form of a buffer chain. In addition, the data buffer 230 may amplify image data to preserve or improve image information.

The data buffer 230 may read data from the memory 240 in a readout operation. The readout operation may refer to an operation where image data stored or recorded at the memory 240 are read from the memory 240. The data buffer 230 may provide image data to an image signal processor (not illustrated) under control of the system control circuit 260. In this case, the data buffer 230 may align the image data provided from the memory 240 in the raster scan order. That is, in the write operation, the data buffer 230 may transfer image data to the memory 240 without aligning the image data. In the readout operation, the data buffer 230 may transfer image data to an image signal processor (not illustrated) after aligning the image data.

The memory 240 may be provided with image data from the data buffer 230 in the write operation. The memory 240 includes a memory cell array for storing image data. Also, the memory 240 may further include a sense amplifier, and image data may be written in or read from the memory cell array through the sense amplifier. The memory cell array and the sense amplifier have substantially similar functions and configurations as the memory cell array 161 and the sense amplifier 165 of FIG. 4, and thus, a detailed description thereof will not be repeated here.

The image sensor control circuit 250 controls operations of the pixel array 210 and the analog-to-digital converter circuit 220. The image sensor control circuit 250 may generate a control signal for controlling operations of the pixel array 210 and the analog-to-digital converter circuit 220. The image sensor control circuit 250 may select pixels, which will output image signals at a particular time, from among the plurality of pixels included in the pixel array 210. The image sensor control circuit 250 may control the analog-to-digital converter circuit 220 so as to convert the output image signals to image data and output the image data in parallel. The image sensor control circuit 250 may provide the system control circuit 260 with image sensor information associated with one or more operations to control of the pixel array 210 and the analog-to-digital converter circuit 220.

The system control circuit 260 may control operations of the data buffer 230 and the memory 240 based on the image sensor information. The system control circuit 260 may determine the write operation or the readout operation and may control the data buffer 230 and the memory 240 such that image data are written in or read from the memory 240. The system control circuit 260 may control the data buffer 230 and the memory 240 such that image data are written in a particular area of the memory 240 in the write operation. To this end, the system control circuit 260 may include a buffer control circuit 262 and a memory control circuit 264.

The buffer control circuit 262 may allow the data buffer 230 to provide a transfer path of image data. The buffer control circuit 262 may control a transfer path of image data received from the analog-to-digital converter circuit 220 in the write operation. The buffer control circuit 262 may control a time point or a time when image data are transferred. In addition, the buffer control circuit 262 may allow the data buffer 230 to align image data read from the memory 240 in the readout operation.

The memory control circuit 264 may control the memory 240 such that image data are written or read. The memory control circuit 264 may generate a bank address, a row address, or a column address corresponding to an area of the memory 240, which image data are written in or read from. The memory control circuit 264 may generate a memory control signal for selecting a memory cell, which image data are written in or read from, based on the bank address, the row address, and/or the column address.

Figure 7:
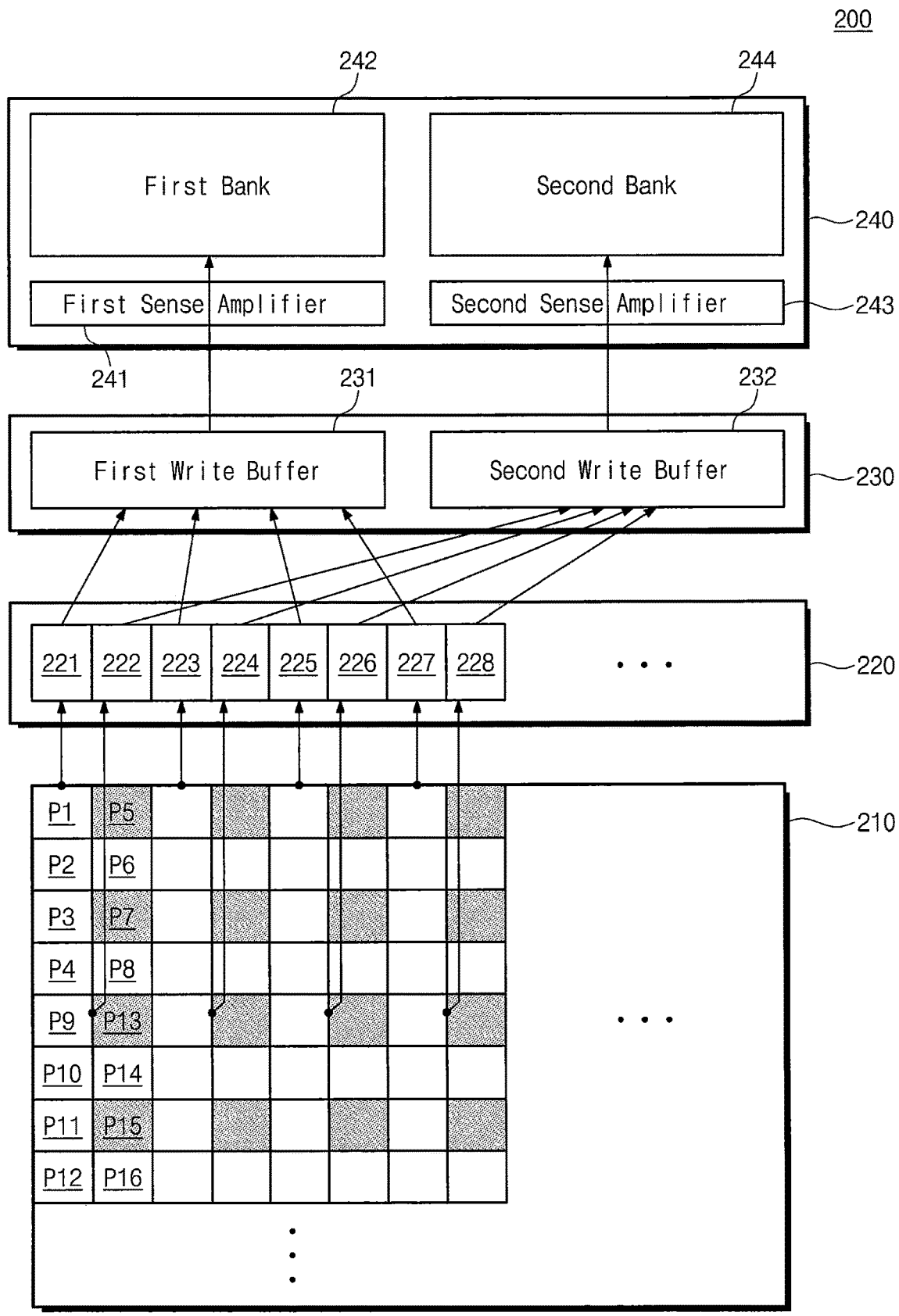
FIG. 7 is a view for describing a write operation of the image sensing system of FIG. 6 according to example embodiments of the present inventive concept.

FIG. 7 is a view for describing an example write operation of an image sensing system of FIG. 6. Referring to FIG. 7, the image sensing system 200 includes the pixel array 210, the analog-to-digital converter circuit 220, the data buffer 230, and the memory 240. The pixel array 210, the analog-to-digital converter circuit 220, the data buffer 230, and the memory 240 may correspond to the pixel array 210, the analog-to-digital converter circuit 220, the data buffer 230, and the memory 240 of FIG. 6, respectively.

The pixel array 210 includes first to sixteenth pixels P1 to P16. A structure of the pixel array 210 may be substantially similar to the structure of the pixel array 111 of FIG. 3. The process where the pixel array 210 outputs an image signal may be substantially similar to the process described with reference to FIG. 3. The first to sixteenth pixels P1 to P16 output first to sixteenth image signals, respectively. For example, during a first sensing time, the first pixel P1 and the ninth pixel P9 output a first image signal and a ninth image signal, and each of the first image signal and the ninth image signal is converted to image data. During a second sensing time following the first sensing time, the second pixel P2 and the tenth pixel P10 output a second image signal and a tenth image signal, and each of the second image signal and the tenth image signal is converted to image data.

The analog-to-digital converter circuit 220 includes a plurality of analog-to-digital converter circuits 221 to 228. The analog-to-digital converter circuits 221 to 228 receive image signals in parallel and convert the received image signals to image data. The analog-to-digital converter circuits 221 to 228 output the image data in parallel. For example, the first analog-to-digital converter circuit 221 sequentially receives the first to eighth image signals, and the second analog-to-digital converter circuit 222 sequentially receives the ninth to sixteenth image signals. The first analog-to-digital converter circuit 221 converts the first to eighth image signals to first to eighth image data and sequentially outputs the first to eighth image data. The second analog-to-digital converter circuit 222 converts the ninth to sixteenth image signals to ninth to sixteenth image data and sequentially outputs the ninth to sixteenth image data. In some embodiments, the first analog-to-digital converter circuit 221 may output the first image data in parallel with the ninth image data from the second analog-to-digital converter circuit 222.

The data buffer 230 may include a first write buffer 231 and a second write buffer 232. The first write buffer 231 may receive image data from the odd-numbered analog-to-digital converter circuits 221, 223, 225, and 227. The second write buffer 232 may receive image data from the even-numbered analog-to-digital converter circuits 222, 224, 226, and 228. The first write buffer 231 and the second write buffer 232 may be provided in such a way that the received image data are written in different banks of the memory 240. That is, the first write buffer 231 and the second write buffer 232 provide different image data transfer paths to different banks of memory.

The first write buffer 231 receives first image data and transfers the first image data to the memory 240. In detail, the first write buffer 231 receives image data associated with pixels disposed at odd-numbered columns of a first row of the pixel array 210 and transfers the received image data to the memory 240. The pixels disposed at the odd-numbered columns of the first row may be pixels of the same color. Afterwards, the first write buffer 231 sequentially receives image data corresponding to pixels disposed at odd-numbered columns of second to fourth rows. Then, the first write buffer 231 sequentially receives the fifth to eighth image data and transfers the fifth to eighth image data to the memory 240. That is, the first write buffer 231 may sequentially receive image data corresponding to pixels disposed at even-numbered columns of the first to fourth rows.

The first write buffer 231 provides a transfer path of all image data associated with the first to fourth rows. Although not illustrated in FIG. 7, the first write buffer 231 may provide a transfer path of all image data associated with the first to fourth rows, ninth to twelfth rows, and seventeenth to twentieth rows. However, the inventive concept is not limited thereto. For example, image data that the first write buffer 231 transfers may vary with the number of memories, the number of banks included in the memory 240, and the like.

The second write buffer 232 receives image data associated with pixels disposed at odd-numbered columns of fifth to eighth rows of the pixel array 210 in parallel and then sequentially transfers the received image data to the memory 240. Then, the second write buffer 232 receives image data associated with pixels disposed at even-numbered columns of the fifth to eighth rows of the pixel array 210 in parallel and subsequently sequentially transfers the received image data to the memory 240. As a result, the second write buffer 232 provides a transfer path of all image data associated with the fifth to eighth rows. The second write buffer 232 may provide a transfer path of all image data associated with the fifth to eighth rows, thirteenth to sixteenth rows, and/or twenty-first to twenty-fourth rows, but the inventive concept is not limited thereto.

The memory 240 may include a first sense amplifier 241, a first bank 242, a second sense amplifier 243, and a second bank 244. The first write buffer 231 may transfer image data to the memory 240 such that the image data are written in the first bank 242 through the first sense amplifier 241. The second write buffer 232 may transfer image data to the memory 240 such that the image data are written in the second bank 244 through the second sense amplifier 243.

Image data corresponding to pixels disposed at odd-numbered columns of the first to fourth rows may be sequentially written in the first bank 242. At the same time or overlapping in time, image data corresponding to pixels disposed at odd-numbered columns of the fifth to eighth rows may be sequentially written in the second bank 244. Afterwards, image data corresponding to pixels disposed at even-numbered columns of the first to fourth rows may be sequentially written in the first bank 242. At the same time or overlapping in time, image data corresponding to pixels disposed at even-numbered columns of the fifth to eighth rows may be sequentially written in the second bank 244. Since the order of image data written in the first bank 242 and the second bank 244 corresponds to the order of image signals output from the pixel array 210, the image data may not be aligned in the arrangement order of a plurality of pixels.

Figure 8:
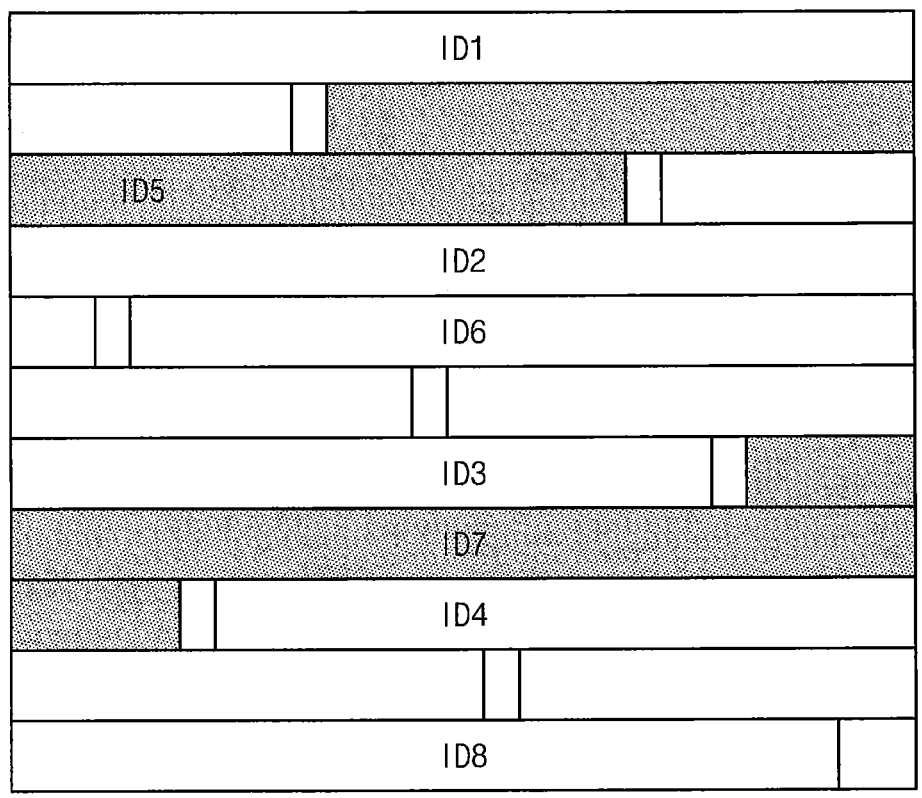
FIG. 8 is a view for describing image data written in a bank of FIG. 7 according to example embodiments of the present inventive concept.

FIG. 8 is a view for describing example image data written in a bank of FIG. 7. The bank 242 of FIG. 8 may correspond to the first bank 242 of memory 240 of FIG. 7. Also, the process of writing image data in the bank 242, which will be described later, may be similarly performed in the second bank 244. Referring to FIG. 8, the first to eighth image data ID1 to ID8 are written in the bank 242. For convenience of description, FIG. 8 will be described with reference to reference marks of FIG. 7.

The first to fourth image data ID1 to ID4 may be image data corresponding to pixels disposed at odd-numbered columns of the first to fourth rows of FIG. 7. The fifth to eighth image data ID5 to ID8 may be image data corresponding to pixels disposed at even-numbered columns of the first to fourth rows of FIG. 7. The first write buffer 231 may sequentially transfer the first to eighth image data ID1 to ID8 to the memory 240. The first to eighth image data ID1 to ID8 are sequentially written in the bank 242.

The bank 242 may include a plurality of memory cells arranged two-dimensionally. The bank 242 may be divided into a plurality of rows where image data are written. The first image data ID1 may be written in the whole first row and a portion of a second row in the bank 242. Then, the second image data ID2 may be written in the bank 242. In detail, the second image data may be written in the remaining portion of a third row other than a portion where the fifth image data ID5 will be written, the whole fourth row, and a portion of a fifth row. Likewise, the third image data ID3 and the fourth image data ID4 may be written in the bank 242 while areas where the sixth image data ID6 and the seventh image data ID7 will be written are reserved. Afterwards, the fifth to eighth image data ID5 to ID8 are written in the bank 242.

The bank 242 may be divided into a plurality of line storage areas. Image data associated with rows of the pixel array 210 may be written in the plurality of line storage areas, respectively. For example, the first image data ID1 and the fifth image data ID5 that are image data associated with the first row of the pixel array 210 may be written in a first line storage area of the bank 242. In a readout operation, image data written in the plurality of line storage areas may be sequentially read. That is, after image data written in the first line storage area are read, image data written in the second line storage area may be read. In a write operation, image data associated with rows of the pixel array 210 may be written in a mixed order. In the readout operation, image data may be sequentially read in the order of rows of the pixel array 210. The above-described operation may be performed under control of the system control circuit 260 of FIG. 6.

Unlike the data write operation of FIG. 8, in the write operation, image data may be written in the bank 242 in the raster scan order. For example, the bank 242 may receive image data from the data buffer 230 in a mixed order, and an area where other image data will be written may be reserved between image data. For example, when the first image data ID1 are written, an area where image data corresponding to a second pixel included in the fifth image data ID5 will be written is reserved between an area where image data corresponding to a first pixel will be written and an area where image data corresponding to a third pixel will be written.

Figure 9:
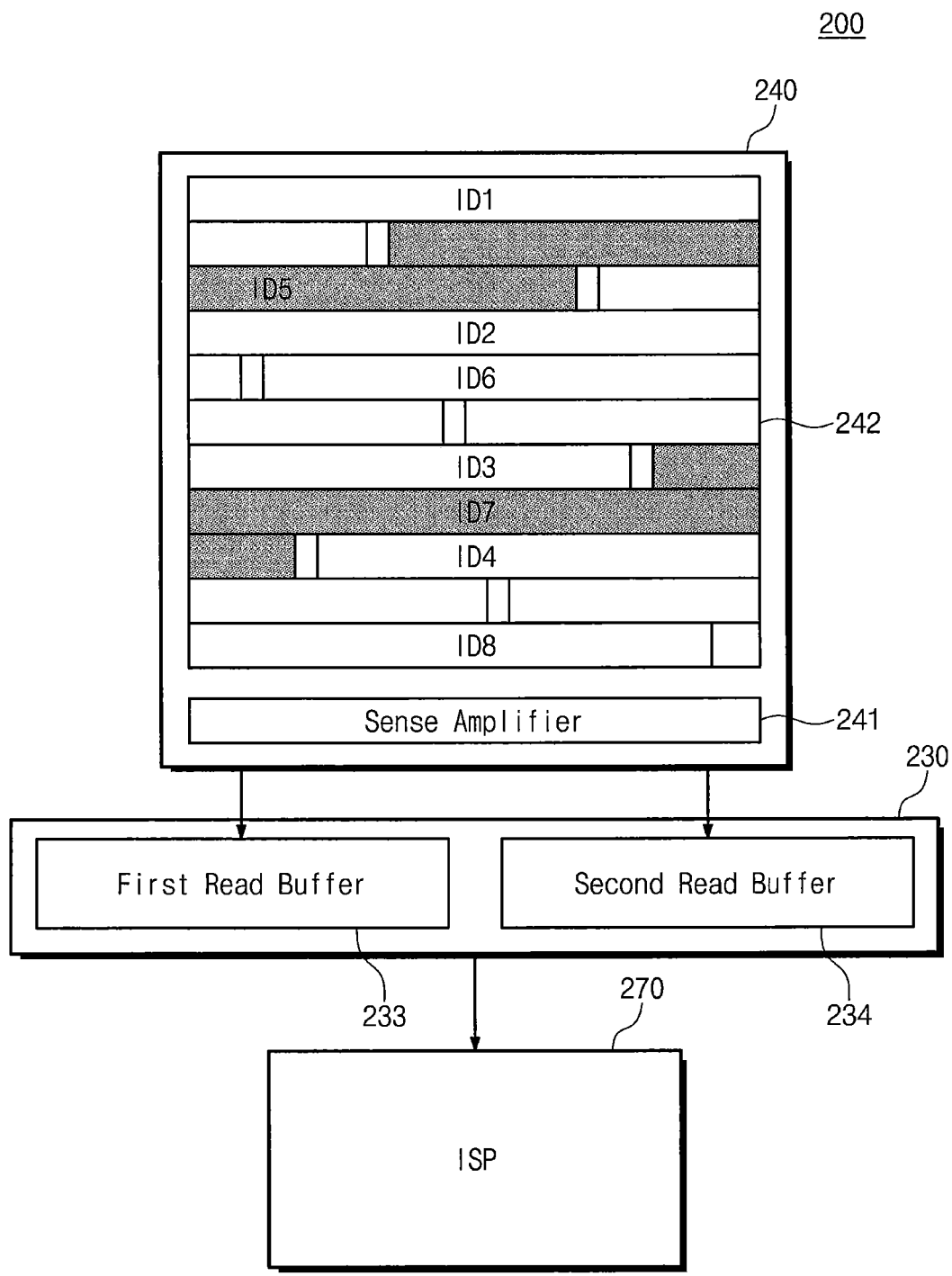
FIG. 9 is a view for describing a readout operation of the image sensing system of FIG. 6 according to example embodiments of the present inventive concept.

FIG. 9 is a view for describing an example readout operation of an image sensing system of FIG. 6. Referring to FIG. 9, the image sensing system 200 includes the data buffer 230, the memory 240, and an image signal processor 270. The data buffer 230 and the memory 240 may be the data buffer 230 and the memory 240 of FIG. 6. The memory 240 includes the sense amplifier 241 and the bank 242. The sense amplifier 241 may be the sense amplifier 241 of FIG. 7, and the bank 242 may be the bank 242 of FIG. 8. For convenience of description, FIG. 9 will be described with reference to reference marks of FIG. 6.

The data buffer 230 may include a first read buffer 233 and a second read buffer 234. In a readout operation, the first to fourth image data ID1 to ID4 are provided to the first read buffer 233. The fifth to eighth image data ID5 to ID8 are provided to the second read buffer 234. That is, image data corresponding to pixels disposed at odd-numbered columns of the pixel array 210 may be provided to the first read buffer 233, and image data corresponding to pixels disposed at even-numbered columns of the pixel array 210 may be provided to the second read buffer 234.

First, the data buffer 230 receives the first image data ID1 and the fifth image data ID5. The first read buffer 233 receives the first image data ID1, and the second read buffer 234 receives the fifth image data ID5. The data buffer 230 aligns the first image data ID1 and the fifth image data ID5. Afterwards, the data buffer 230 may sequentially receive the second and sixth image data ID2 and ID6, the third and seventh image data ID3 and ID7, and the fourth and eighth image data ID4 and ID8.

The data buffer 230 may align image data by combining image data which are transferred to the first read buffer 233 and correspond to pixels disposed at odd-numbered columns and image data, which are transferred to the second read buffer 234 and correspond to pixels disposed at even-numbered columns. For example, the first image data ID1 may be image data corresponding to pixels disposed at odd-numbered columns of the first row of the pixel array 210, and the fifth image data ID5 may be image data corresponding to pixels disposed at even-numbered columns of the first row of the pixel array 210. That is, image data may be aligned by inserting the fifth image data ID5 into the first image data ID1. To this end, the data buffer 230 may include an alignment circuit (not illustrated).

Image data may be written in the memory 240 after being aligned in units of rows of the pixel array 210. However, image data may not be written in the memory 240 in the raster scan order. That is, the image sensing system 200 according to some embodiments of the inventive concept may write image data in the memory 240 through an optimized path without data alignment in a write operation and may align and provide image data in a readout operation to allow the image signal processor 270 or the like to perform an image processing operation easily.

However, the inventive concept is not limited thereto. For example, as described with reference to FIG. 8, in the case where image data are written in the memory 240 in the raster scan order in a write operation, image data may be transferred from the data buffer 230 to the image signal processor 270 without an image data aligning process in a readout operation. In this case, the first read buffer 233 and the second read buffer 234 may not be provided in the data buffer 230.

The image signal processor 270 is provided with the aligned image data from the data buffer 230. The image signal processor 270 may perform various image processing operations based on the aligned image data. The image signal processor 270 may not perform an image processing operation accompanying alignment of image data in the write operation and may perform the image processing operation in the readout operation. That is, in the case where aligned image data are required, the image signal processor 270 may read image data written in the memory 240 to perform image processing. However, the image signal processor 270 may not be directly provided with image data from the pixel array 210 for image processing.

Figure 10:
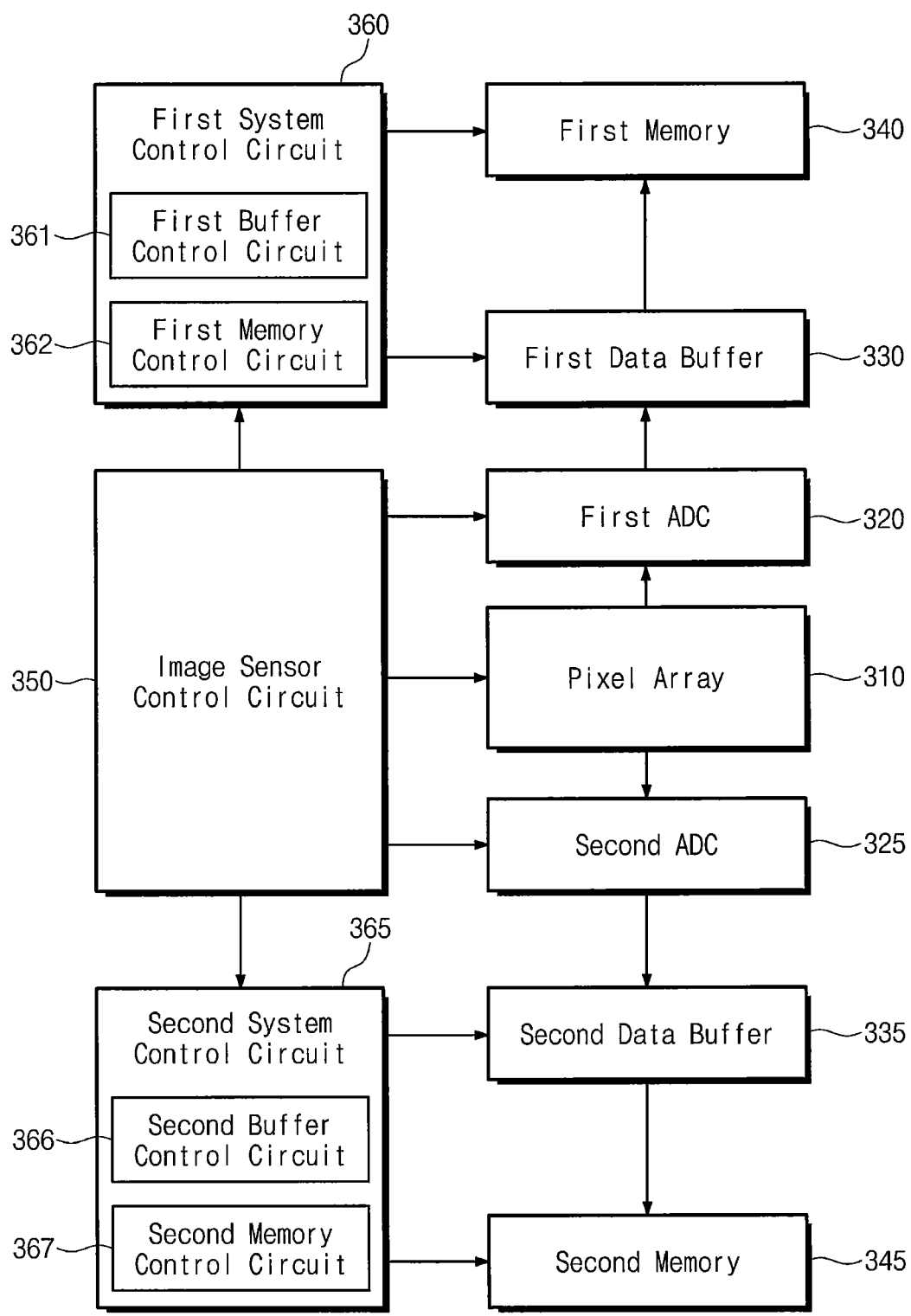
FIG. 10 is a block diagram of an image sensing system according to example embodiments of the present inventive concept.

FIG. 10 is a block diagram of an image sensing system according to some embodiments of the inventive concept. Referring to FIG. 10, an image sensing system 300 includes a pixel array 310, a first analog-to-digital converter (ADC) circuit 320, a second analog-to-digital converter (ADC) circuit 325, a first data buffer 330, a second data buffer 335, a first memory 340, a second memory 345, an image sensor control circuit 350, a first system control circuit 360, and a second system control circuit 365.

Like the pixel array 210 of FIG. 6, the pixel array 310 includes a plurality of pixels arranged two-dimensionally. The plurality of pixels may generate image signals and may output the image signals to the first analog-to-digital converter circuit 320 or the second analog-to-digital converter circuit 325. The half of the plurality of pixels may output image signals to the first analog-to-digital converter circuit 320, the others of the plurality of pixels may output image signals to the second analog-to-digital converter circuit 325. Compared with FIG. 6, since two analog-to-digital converter circuits are used, a speed at which image signals are converted may increase. However, the inventive concept is not limited to FIG. 10. For example, "M" analog-to-digital converter circuits (M being 4, 8, or 16) may be included in the image sensing system 300.

The first and second analog-to-digital converter circuits 320 and 325 may convert the received image signals to image data. The first data buffer 330 transfers image data received from the first analog-to-digital converter circuit 320 to the first memory 340. The second data buffer 335 transfers image data received from the second analog-to-digital converter circuit 325 to the second memory 345. The image data provided from the first data buffer 330 are written in the first memory 340, and the image data provided from the second data buffer 335 are written in the second memory 345. Configurations of the first and second analog-to-digital converter circuits 320 and 325, the first and second data buffers 330 and 335, and the first and second memories 340 and 345 are substantially similar to the configurations of the analog-to-digital converter circuit 220, the data buffer 230, and the memory 240 of FIG. 6, and thus, a detailed description thereof will not be repeated here.

The image sensor control circuit 350 controls operations of the pixel array 310 and the first and second analog-to-digital converter circuits 320 and 325. The image sensor control circuit 350 may perform substantially similar functions as the image sensor control circuit 250 of FIG. 6.

The first system control circuit 360 controls operations of the first data buffer 330 and the first memory 340. The first system control circuit 360 may include a first buffer control circuit 361 for controlling an operation of the first data buffer 330 and a first memory control circuit 362 for controlling an operation of the first memory 340. The second system control circuit 365 controls operations of the second data buffer 335 and the second memory 345. The second system control circuit 365 may include a second buffer control circuit 366 for controlling an operation of the second data buffer 335 and a second memory control circuit 367 for controlling an operation of the second memory 345. The first and second system control circuits 360 and 365 may perform substantially similar functions as the system control circuit 260 of FIG. 6.

Figure 11:
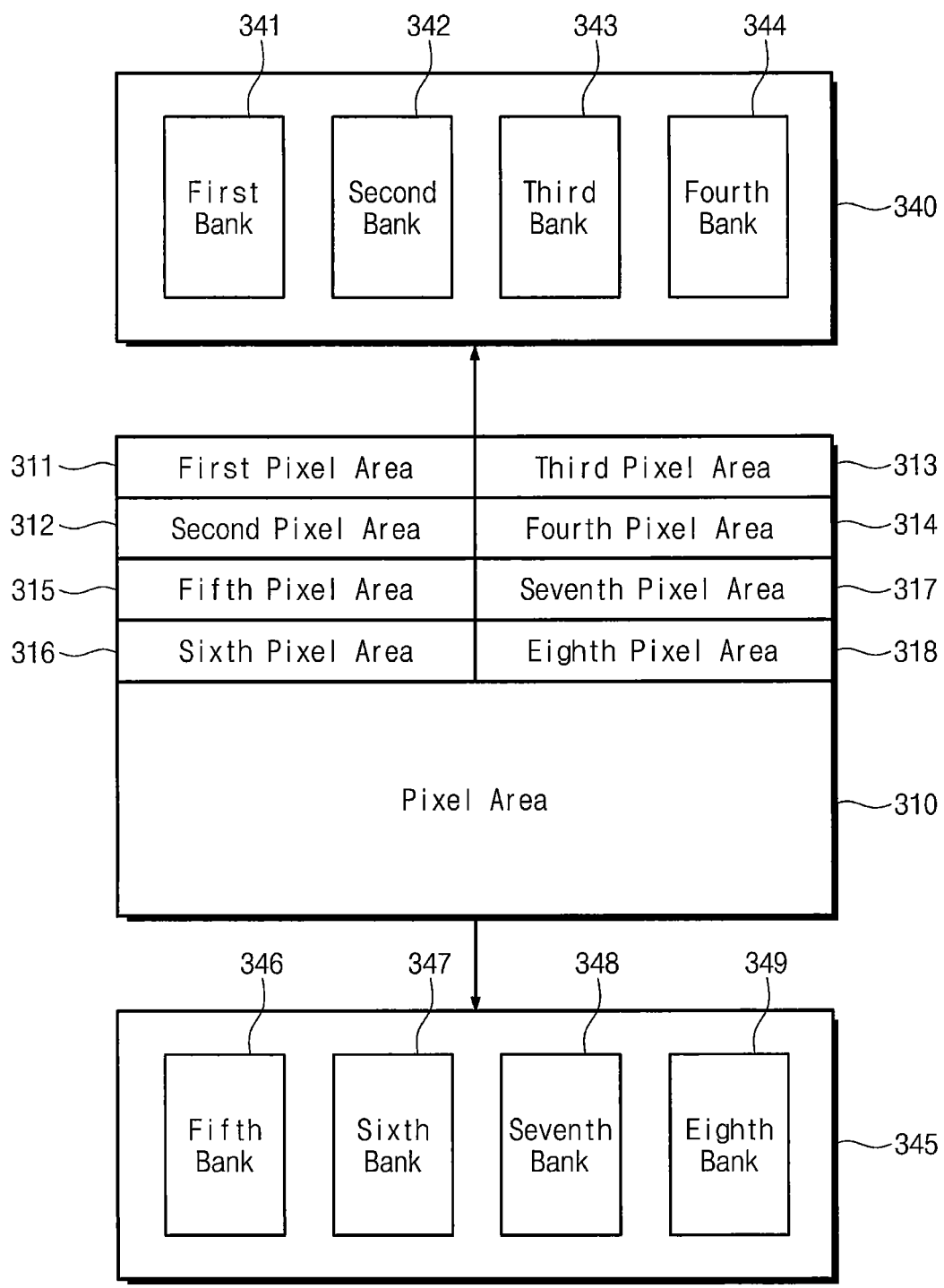
FIG. 11 is a view for describing write and readout operations of the image sensing system of FIG. 10 according to example embodiments of the present inventive concept.

FIG. 11 is a view for describing example write and readout operations of an image sensing system of FIG. 10. Referring to FIG. 11, the image sensing system 300 includes the pixel array 310, the first memory 340, and the second memory 345. The pixel array 310, the first memory 340, and the second memory 345 may correspond to the pixel array 310, the first memory 340, and the second memory 345 of FIG. 10, respectively. For convenience of description, the first and second analog-to-digital converter circuits 320 and 325 and the first and second data buffers 330 and 335 are omitted.

The pixel array 310 includes first to eighth pixel areas 311 to 318. The pixel array 310 may output image signals in a similar manner as the pixel array 111 of FIG. 3. For example, after odd-numbered pixels of first to fourth rows and odd-numbered pixels of fifth to eighth rows sequentially output image signals, even-numbered pixels of the first to fourth rows and even-numbered pixels of the fifth to eighth rows may sequentially output image signals.

As such, in the case where image signals are output in units of four rows, the half of pixels of the first to fourth rows may be included in the first pixel area 311, and the others of the pixels of the first to fourth rows may be included in the third pixel area 313. The half of pixels of the fifth to eighth rows may be included in the second pixel area 312, and the others of the pixels of the fifth to eighth rows may be included in the fourth pixel area 314. The half of pixels of the ninth to twelfth rows may be included in the fifth pixel area 315, and the others of the pixels of the ninth to twelfth rows may be included in the seventh pixel area 317. The half of pixels of the thirteenth to sixteenth rows may be included in the sixth pixel area 316, and the others of the pixels of the thirteenth to sixteenth rows may be included in the eighth pixel area 318.

The first memory 340 is divided into first to fourth banks BANK1 to BANK4. The second memory 345 is divided into fifth to eighth banks BANK5 to BANK8. In a write operation, the pixels of the first to eighth pixel areas 311 to 318 may simultaneously output image signals. That is, image data associated with the first to eighth pixel areas 311 to 318 may be simultaneously written in the first to eighth banks 341 to 344 and 346 to 349. Accordingly, since image data corresponding to pixels of first to sixteenth rows of the pixel array 310 are simultaneously written, image data may be written at a faster speed compared with an operation of writing image data, which is described with reference to FIG. 7.

In a readout operation, image data written in the first and second memories 340 and 345 may be read, and the read image data may be provided to an image signal processor (not illustrated). In this case, alignment of image data may be required. Accordingly, image data may be read to correspond to the order of rows of the pixel array 310. First, image data associated with the first pixel area 311 and the third pixel area 313 may be read from the first bank 341 and the third bank 343. Image data associated with the second pixel area 312 and the fourth pixel area 314 may be read from the second bank 342 and the fourth bank 344. Then, image data associated with the fifth pixel area 315 and the seventh pixel area 317 may be read from the fifth bank 346 and the seventh bank 348. And then, image data associated with the sixth pixel area 316 and the eighth pixel area 318 may be read from the sixth bank 347 and the eighth bank 349.

Figure 12:
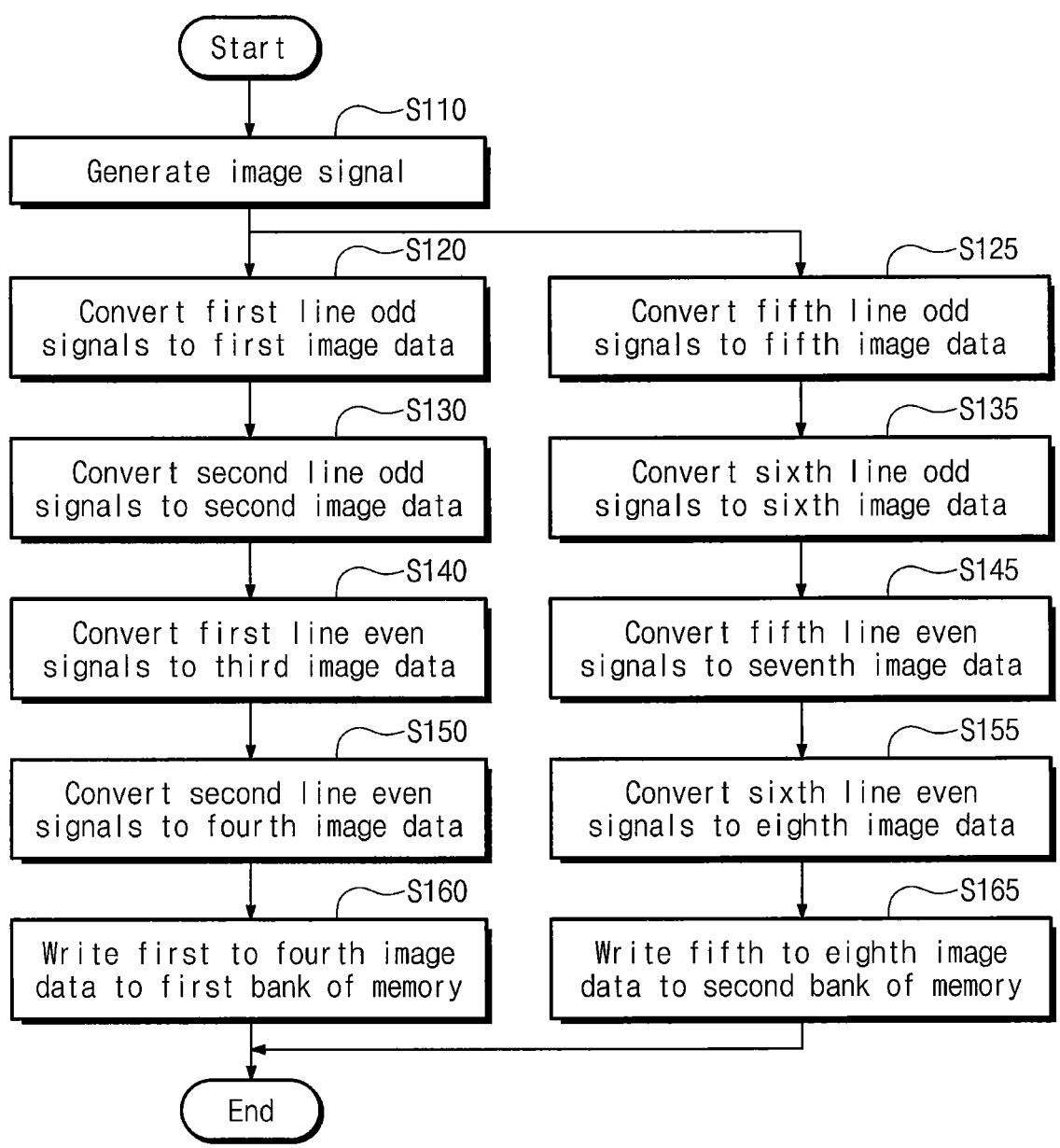
FIG. 12 is a flowchart of a method in which an image sensing system, according to example embodiments of the present inventive concept, performs a write operation on image data.

FIG. 12 is a flowchart of a method in which an image sensing system according to some embodiments of the inventive concept performs a write operation on image data. A method of performing a write operation on image data, which is illustrated in FIG. 12, is performed in the image sensing system 200 of FIG. 6 or the image sensing system 300 of FIG. 10. For convenience of description, the flowchart of FIG. 12 will be described with reference to reference marks of FIGS. 6 and 7. FIG. 12 describes, for example, a write operation where image data are written by a unit of four rows. However, the inventive concept is not limited thereto. For example, it may be understood that it is possible to perform a write operation on image data in various row units.

In operation S110, the pixel array 210 generates an image signal(s). The image signal may be generated under control of the image sensor control circuit 250. The pixel array 210 includes a plurality of line pixel arrays. Each line pixel array includes pixels arranged in the row direction. For convenience of description, it is assumed that a manner of outputting image signals generated from a plurality of pixels is similar to an image signal output manner of FIG. 7.

In operation S120, the analog-to-digital converter circuit 220 converts image signals corresponding to odd-numbered pixels of a first row to first image data. At the same time or overlapping in time, in operation S125, the analog-to-digital converter circuit 220 converts image signals corresponding to odd-numbered pixels of a fifth row to fifth image data. Since it is assumed that image signals are simultaneously output in units of four rows, the image signals provided from pixels of the first row and the fifth row may be simultaneously converted, and the fifth row may be changed to any other row depending on a way to output image signals.

In operation S130, the analog-to-digital converter circuit 220 converts image signals corresponding to odd-numbered pixels of a second row to second image data. At the same time or overlapping in time, in operation S135, the analog-to-digital converter circuit 220 converts image signals corresponding to odd-numbered pixels of a sixth row to sixth image data. Afterwards, the analog-to-digital converter circuit 220 converts image signals corresponding to odd-numbered pixels of a third row and image signals corresponding to odd-numbered pixels of a seventh row, and converts image signals corresponding to odd-numbered pixels of a fourth row and image signals corresponding to odd-numbered pixels of an eighth row.

In operation S140, the analog-to-digital converter circuit 220 converts image signals corresponding to even-numbered pixels of the first row to third image data. At the same time or overlapping in time, in operation S145, the analog-to-digital converter circuit 220 converts image signals corresponding to even-numbered pixels of the fifth row to seventh image data.

In operation S150, the analog-to-digital converter circuit 220 converts image signals corresponding to even-numbered pixels of the second row to fourth image data. At the same time or overlapping in time, in operation S155, the analog-to-digital converter circuit 220 converts image signals corresponding to even-numbered pixels of the sixth row to eighth image data. Afterwards, the analog-to-digital converter circuit 220 converts image signals corresponding to even-numbered pixels of the third row and image signals corresponding to even-numbered pixels of the seventh row, and converts image signals corresponding to even-numbered pixels of the fourth row and image signals corresponding to even-numbered pixels of the eighth row.

In operation S160, the first to fourth image data are written in the first bank 242 of the memory 240. That is, image data corresponding to pixels of the first to fourth rows are written in the first bank 242. The first to fourth image data may be transferred to the first bank 242 through the first write buffer 231. The first to fourth image data may be written in the first bank 242 in the converted order.

At the same time or overlapping in time, in operation S165, the fifth to eighth image data are written in the second bank 244 of the memory 240. That is, image data corresponding to pixels of the fifth to eighth rows are written in the second bank 244. The fifth to eighth image data may be transferred to the second bank 244 through the second write buffer 232. The fifth to eighth image data may be written in the second bank 244 in the converted order.

Figure 13:
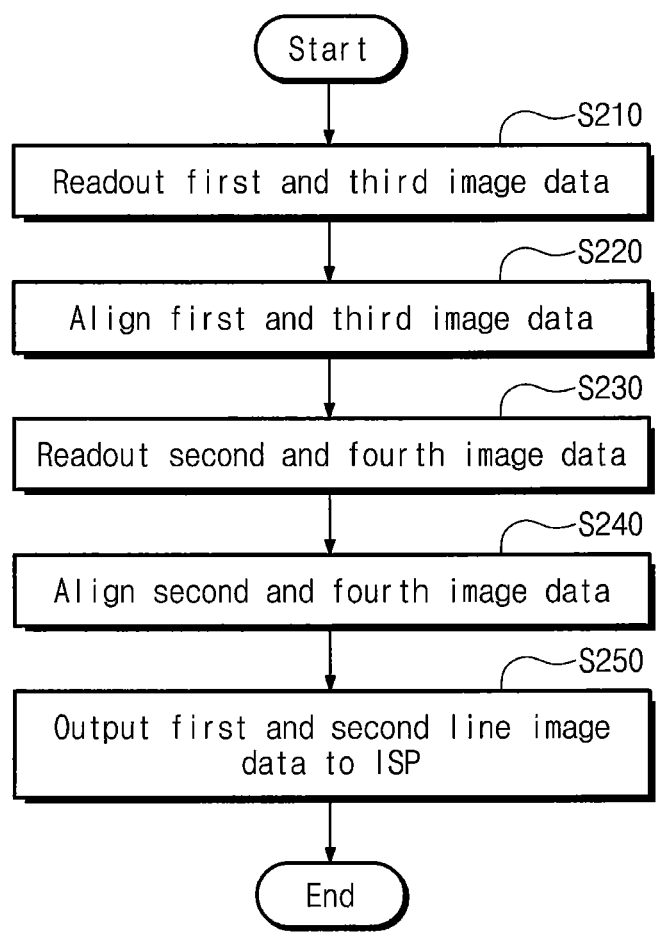
FIG. 13 is a flowchart of a method in which an image sensing system, according to example embodiments of the present inventive concept, performs a readout operation on image data.

FIG. 13 is a flowchart of a method in which an image sensing system according to some embodiments of the inventive concept performs a readout operation on image data. A method of performing a readout operation on image data, which is illustrated in FIG. 13, is performed in the image sensing system 200 of FIG. 6 or the image sensing system 300 of FIG. 10. For convenience of description, the flowchart of FIG. 13 will be described with reference to reference marks of FIGS. 6 and 9. Also, it is assumed that first to fourth image data described with reference to FIG. 13 are the first to fourth image data written in FIG. 12. However, the inventive concept is not limited thereto. For example, it may be understood that various readout operations are possible depending on the amount of image data grouped according to the number of banks.

In operation S210, the first and third image data are read from the first bank 242 of the memory 240. The first image data are associated with odd-numbered pixels of a first row, and the third image data are associated with even-numbered pixels of the first row. That is, the first and third image data associated with the pixels of the first row are provided to the data buffer 230. The first image data may be provided to the first read buffer 233, and the third image data may be provided to the second read buffer 234.

In operation S220, the first image data and the third image data are aligned. The data buffer 230 may align the first image data grouped with respect to the odd-numbered pixels and the third image data grouped with respect to the even-numbered pixels. The data buffer 230 may insert the third image data between the first image data.

In operation S230, second and fourth image data are read from the first bank 242 of the memory 240. The second image data are associated with odd-numbered pixels of a second row, and the fourth image data are associated with even-numbered pixels of the second row. That is, the second and fourth image data associated with the pixels of the second row are provided to the data buffer 230. The second image data may be provided to the first read buffer 233, and the fourth image data may be provided to the second read buffer 234.

In operation S240, the second image data and the fourth image data are aligned. The data buffer 230 may align the second image data grouped with respect to the odd-numbered pixels and the fourth image data grouped with respect to the even-numbered pixels. The data buffer 230 may insert the fourth image data between the second image data. Afterwards, image data associated with a third row and a fourth row are read and aligned. Also, after image data associated with the first to fourth rows are read from the first bank 242, image data associated with fifth to eighth rows may be read from the second bank 244 and the read image data may be aligned.

In operation S250, the data buffer 230 outputs first row image data obtained by aligning the first and third image data and outputs second row image data obtained by aligning the second and fourth image data. The data buffer 230 may output the first and second row image data to the image signal processor 270. Also, the data buffer 230 may output row image data associated with the third to eighth rows and the remaining rows to the image signal processor 270.

Figure 14:
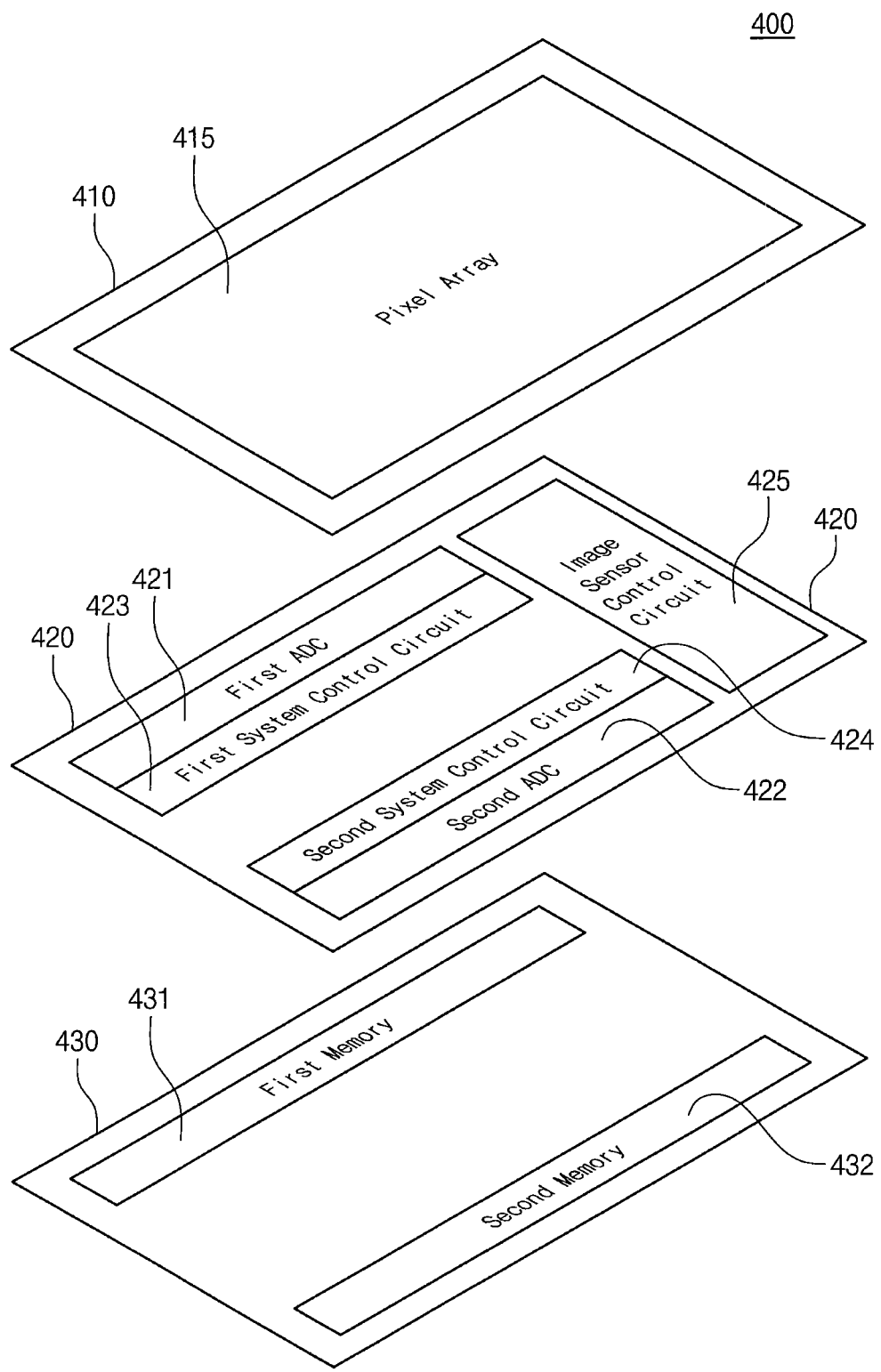
FIG. 14 is a view for describing a structure of an image sensing system according to example embodiments of the present inventive concept.

FIG. 14 is a view for describing an example structure of an image sensing system according to some embodiments of the inventive concept. Referring to FIG. 14, an image sensing system 400 includes a first substrate 410, a second substrate 420, and a third substrate 430. The first to third substrates 410 to 430 may be configured in a stack structure. The image sensing system 400 of FIG. 14 may be understood as an embodiment of a multi-stack structure where memories are merged. However, the inventive concept is not limited thereto. For example, the image sensing system 400 may be implemented with various embodiments where a memory is embedded or a pixel array is customized in a memory.

The first substrate 410 may include a pixel array 415. The pixel array 415 may be substantially similar to the pixel array 210 of FIG. 6 or the pixel array 310 of FIG. 10. The pixel array 415 may output image signals in a similar manner as described with reference to FIG. 3. The pixel array 415 may be connected with the second substrate 420 and may output image signals to the second substrate 420.

The second substrate 420 may include a first analog-to-digital converter circuit 421, a second analog-to-digital converter circuit 422, a first system control circuit 423, a second system control circuit 424, and an image sensor control circuit 425. Also, although not illustrated in FIG. 14, the second substrate 420 may further include first and second data buffers, an image signal processor, and an interface area. The first and second analog-to-digital converter circuits 421 and 422, the first and second system control circuits 423 and 424, and the image sensor control circuit 425 may be substantially similar to the first and second analog-to-digital converter circuits 320 and 325, the first and second system control circuits 360 and 365, and the image sensor control circuit 350, and thus, a detailed description thereof will not be repeated here.

The first and second analog-to-digital converter circuits 421 and 422 may convert image signals received from the pixel array 415 of the first substrate 410 to image data. The image data may be provided to the third substrate 430 without alignment. Accordingly, a configuration for aligning image data may not be required, and a transfer path for an interface between the third substrate 430 and the first and second analog-to-digital converter circuits 421 and 422 may be minimized. This may mean that the area of the second substrate 420 decreases. Also, power to be consumed in a data transfer process of the second substrate 420 may be reduced.

The third substrate 430 may include a first memory 431 and a second memory 432. The first and second memories 431 and 432 may be a DRAM, but the inventive concept is not limited thereto. The first memory 431 and the second memory 432 may be substantially similar to the first memory 340 and the second memory 345 of FIG. 10. In a write operation, image data that are not aligned may be written in the first and second memories 431 and 432. In a readout operation, image data may be read from the first memory 431 and the second memory 432, and the read image data may be output to an image signal processor (not illustrated) after being aligned in the raster scan order.

An image sensing system and an operating method thereof, according to some embodiments of the inventive concept, may be implemented in such a way that alignment of image data is omitted in a write operation. In this case, as a data transfer path is optimized, power consumption and the area for implementation may be reduced.

As used herein, the term "and/or" includes any and all combinations of one or more of the associated listed items. Expressions such as "at least one of," when preceding a list of elements, modify the entire list of elements and do not modify the individual elements of the list.

While the inventive concept has been described with reference to example embodiments thereof, it will be apparent to those of ordinary skill in the art that various changes and modifications may be made thereto without departing from the spirit and scope of the inventive concept as set forth in the following claims.

What is claimed is:

1. An image sensing system comprising:
a pixel array comprising a first pixel, a second pixel, and a third pixel interposed between the first pixel and the second pixel;
an analog-to-digital converter circuit configured to convert a first image signal received from the first pixel to first image data during a first sensing time, to convert a second image signal received from the second pixel to second image data during the first sensing time, and to convert a third image signal received from the third pixel to third image data during a second sensing time following the first sensing time; and
a memory in which the first image data and the second image data are written during a first write time and in which the third image data are written during a second write time following the first write time,
wherein the first to third pixels are arranged in a row direction,
wherein the memory comprises a first line storage area in which the first to third image data are stored, and
wherein the first line storage area comprises:
an odd-numbered pixel storage area in which the first image data and the second image data are written during the first write time; and
an even-numbered pixel storage area in which the third image data are written during the second write time.

2. The image sensing system of claim 1, wherein the first pixel and the second pixel sense a first color, and the third pixel senses a second color that is different from the first color.

3. The image sensing system of claim 1, wherein the analog-to-digital converter circuit comprises:
a first analog-to-digital converter circuit configured to convert the first image signal to the first image data during the first sensing time and to convert the third image signal to the third image data during the second sensing time; and
a second analog-to-digital converter circuit configured to convert the second image signal to the second image data during the first sensing time.

4. The image sensing system of claim 3, further comprising:
a data buffer configured to transfer the first image data and the third image data from the first analog-to-digital converter circuit to the memory and configured to transfer the second image data from the second analog-to-digital converter circuit to the memory.

5. The image sensing system of claim 4, wherein the data buffer transfers the first to third image data to the memory in an order in which the first to third image data are converted by the first and second analog-to-digital converter circuits.

6. The image sensing system of claim 4, wherein the data buffer comprises:
a first write buffer configured to transfer the first image data to the memory during the first write time and to transfer the third image data to the memory during the second write time; and
a second write buffer configured to transfer the second image data to the memory during the first write time.

7. The image sensing system of claim 1,
wherein the first to third pixels are arranged in a column direction, and
wherein the memory comprises:
a first bank in which the first image data are written during the first write time and in which the third image data are written during the second write time following the first write time; and
a second bank in which the second image data are written during the first write time.

8. The image sensing system of claim 7,
wherein the first bank further comprises a second line storage area, and
wherein the first image data are stored in the first line storage area and the third image data are stored in the second line storage area.

9. The image sensing system of claim 8,
wherein the pixel array further comprises a fourth pixel adjacent to the first pixel in a row direction,
wherein the analog-to-digital converter circuit converts a fourth image signal received from the fourth pixel to fourth image data during a third sensing time that is after the second sensing time, and
wherein the fourth image data are stored in the first line storage area during a third write time after the second write time.

10. The image sensing system of claim 1,
wherein the pixel array further comprises a fourth pixel adjacent to the first pixel in a column direction,
wherein the analog-to-digital converter circuit converts a fourth image signal received from the fourth pixel to fourth image data during a fifth sensing time between the first sensing time and the second sensing time, and
wherein the memory further comprises:
a second line storage area in which the fourth image data are stored during a fifth write time between the first write time and the second write time.

11. The image sensing system of claim 10, wherein the first and third image data are read from the memory during a first read time, and the fourth image data are read from the memory during a second read time following the first read time.

12. The image sensing system of claim 1, further comprising:
an image sensor control circuit configured to control outputs of the first to third image signals, to control conversion of the first to third image signals to the first to third image data, and to output image sensor information; and
a system control circuit configured to control transfer and/or write operations of the first to third image data in response to the image sensor information.

13. An image sensing system comprising:
a pixel array comprising a first pixel configured to output a first image signal, a second pixel configured to output a second image signal, and a third pixel configured to output a third image signal after the first and second image signals are output, wherein the third pixel is interposed between the first pixel and the second pixel, and wherein the first to third pixels are arranged in a column direction;
an analog-to-digital converter circuit configured to convert the third image signal to third image data after converting the first and second image signals to first and second image data, respectively;
a memory comprising a first bank in which the third image data are written during a second write time after the first image data are written during a first write time in the first bank of the memory and the second image data are written during the first write time in a second bank of the memory; and
a data buffer configured to transfer the third image data to the memory after transferring the first and the second image data to the memory in one or more write operations, wherein, in one or more readout operations, the data buffer outputs the second image data after outputting the first image data and outputs the third image data after outputting the second image data, wherein the first bank comprises a first line storage area and a second line storage area, wherein the first image data are stored in the first line storage area and the third image data are stored in the second line storage area, wherein the pixel array further comprises a fourth pixel adjacent to the first pixel in a row direction, wherein the analog-to-digital converter circuit converts a fourth image signal received from the fourth pixel to fourth image data, and wherein the fourth image data are stored in the first line storage area during a third write time after the second write time.

14. The image sensing system of claim 13, further comprising:

an image sensor control circuit configured to control output times of the first to third image signals; and a system control circuit configured to control the one or more write operations and the one or more readout operations in response to the output times from the image sensor control circuit, wherein the system control circuit comprises:
a buffer control circuit configured to control transfer paths of the first to third image data; and
a memory control circuit configured to control areas of the memory where the first to third image data are written.

15. The image sensing system of claim 13, wherein the analog-to-digital converter circuit comprises:

a first analog-to-digital converter circuit configured to convert the first image signal to the first image data and to convert the third image signal to the third image data; and a second analog-to-digital converter circuit configured to convert the second image signal to the second image data, wherein the memory comprises:
a first memory comprising a first portion of the memory in which the first image data and the third image data are written; and
a second memory comprising a second portion of the memory in which the second image data are written.

16. The image sensing system of claim 13, further comprising:

an image signal processor configured to receive the first to third image data output from the data buffer in the one or more readout operations.

17. A method of operating an image sensing system, the method comprising:

generating an image signal corresponding to one frame at a pixel array comprising first to fourth line pixel arrays arranged in a column direction;

converting an image signal generated from first pixels of the first line pixel array to first image data and converting an image signal generated from third pixels of the third line pixel array to third image data, during a first sensing time;

converting an image signal generated from second pixels of the second line pixel array to second image data and converting an image signal generated from fourth pixels of the fourth line pixel array to fourth image data, during a second sensing time following the first sensing time;

converting an image signal generated from first remaining pixels excluding the first pixels of the first line pixel array to fifth image data and converting an image signal generated from third remaining pixels excluding the third pixels of the third line pixel array to seventh image data, during a third sensing time following the second sensing time;

converting an image signal generated from remaining pixels excluding the second pixels of the second line pixel array to sixth image data and converting an image signal generated from fourth remaining pixels excluding the fourth pixels of the fourth line pixel array to eighth image data, during a fourth sensing time following the third sensing time;

writing the first image data in a first bank of a memory and writing the third image data in a second bank of the memory, during a first write time;

writing the second image data in the first bank of the memory and writing the fourth image data in the second bank of the memory, during a second write time following the first write time, writing the fifth image data in the first bank and writing the seventh image data in the second bank, during a third write time following the second write time; and writing the sixth image data in the first bank and writing the eighth image data in the second bank, during a fourth write time following the third write time.

18. The method of claim 17, further comprising:

reading the first image data and the fifth image data from the memory;

aligning the first image data and the fifth image data so as to correspond to an arrangement order of the first line pixel array;

reading the second image data and the sixth image data from the memory; and aligning the second image data and the sixth image data so as to correspond to an arrangement order of the second line pixel array.

* * * * *